US012522856B2

(12) United States Patent
Scharfe et al.

(10) Patent No.: US 12,522,856 B2
(45) Date of Patent: Jan. 13, 2026

(54) METHODS AND SYSTEMS FOR MULTIPLEX GENE AMPLIFICATION FROM ULTRA-LOW DNA INPUT AMOUNTS AND USES THEREOF

(71) Applicant: The Board of Trustees of the Leland Stanford Junior University, Stanford, CA (US)

(72) Inventors: Curt Scharfe, North Haven, CT (US); Peidong Shen, Union City, CA (US); Ronald W. Davis, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 1066 days.

(21) Appl. No.: 17/275,566

(22) PCT Filed: Sep. 11, 2019

(86) PCT No.: PCT/US2019/050616
§ 371 (c)(1),
(2) Date: Mar. 11, 2021

(87) PCT Pub. No.: WO2020/056004
PCT Pub. Date: Mar. 19, 2020

(65) Prior Publication Data
US 2022/0098640 A1 Mar. 31, 2022

Related U.S. Application Data

(60) Provisional application No. 62/729,921, filed on Sep. 11, 2018.

(51) Int. Cl.
*C12Q 1/6806* (2018.01)

(52) U.S. Cl.
CPC .................. *C12Q 1/6806* (2013.01)

(58) Field of Classification Search
CPC ............. C12Q 1/686; C12Q 2525/161; C12Q 2537/143
See application file for complete search history.

(56) References Cited

U.S. PATENT DOCUMENTS

| 6,207,372 | B1 | 3/2001 | Shuber |
| 6,890,741 | B2 | 5/2005 | Fan et al. |
| 7,510,829 | B2 | 3/2009 | Faham et al. |
| 7,695,941 | B2 | 4/2010 | Lin et al. |
| 8,999,642 | B2 | 4/2015 | Sabot et al. |
| 9,328,378 | B2 | 5/2016 | Earnshaw et al. |
| 9,523,121 | B2 | 12/2016 | Spier et al. |
| 9,605,305 | B2 | 3/2017 | Wang et al. |
| 2004/0224352 | A1 | 11/2004 | Fan et al. |
| 2010/0009412 | A1* | 1/2010 | Reynolds |
| 2010/0311064 | A1 | 12/2010 | Oliphant et al. |
| 2016/0060621 | A1 | 3/2016 | Agresti et al. |

FOREIGN PATENT DOCUMENTS

| EP | 0731177 A2 | 9/1996 | |
| EP | 2702170 B1 | 12/2015 | |
| WO | WO-2012112804 A1 * | 8/2012 | ......... C12N 15/1075 |
| WO | 2013081755 A1 | 6/2013 | |
| WO | 2020056004 A1 | 3/2020 | |
| WO | 2020056004 A8 | 6/2020 | |

OTHER PUBLICATIONS

Richards, "Multiplex PCR amplification from the CFTR gene using DNA prepared from buccal brushes/swabs," Human Molecular Genetics, vol. 2, No. 2, pp. 159-163. (Year: 1993).*
Invitation to Pay Additional Fees and, Where Applicable, Protest Fee for International Application No. PCT/US2019/050616, Mailed Nov. 14, 2019, 3 pgs.
International Preliminary Report on Patentability for International Application PCT/US2019/050616, Report issued Mar. 9, 2021, Mailed Mar. 25, 2021, 7 pgs.
International Search Report and Written Opinion for International Application No. PCT/US2019/050616, Search completed Jan. 6, 2020, Mailed Jan. 16, 2020, 14 pgs.
"Multiplexed Sequencing with the Illumina Genome Analyzer System", Illumina, Inc., Dec. 2, 2008, 4 pgs.
Abel et al., "Detection of structural DNA variation from next generation sequencing data: a review of informatic approaches", Cancer Genetics, vol. 206, No. 12, Dec. 2013, pp. 432-440, doi: 10.1016/j.cancergen.2013.11.002.
Abou Tayoun et al., "A Comprehensive Assay for CFTR Mutational Analysis Using Next-Generation Sequencing", Clinical Chemistry, vol. 59, No. 10, Oct. 1, 2013, pp. 1481-1488, https://doi.org/10.1373/clinchem.2013.206466.
Andreson et al., "Genomemasker package for designing unique genomic PCR primers", BMC Bioinformatics, vol. 7, No. 172, Mar. 27, 2006, 11 pgs., doi:10.1186/1471-2105/7/172.
Baker et al., "Improving newborn screening for cystic fibrosis using next-generation sequencing technology: a technical feasibility study", Genetics in Medicine, vol. 18, Feb. 12, 2015, pp. 231-238, doi:10.1038/gim.2014.209.
Berg et al., "Newborn Sequencing in Genomic Medicine and Public Health", Pediatrics, vol. 139, No. 2, Feb. 2017, 13 pgs., doi:10.1542/peds.2016-2252.

(Continued)

*Primary Examiner* — Young J Kim
(74) *Attorney, Agent, or Firm* — KPPB LLP

(57) ABSTRACT

Systems and methods of performing multiplex PCR on low and ultra-low quantities of starting template using custom primer sequences having a homotag. In some embodiments, these primers are capable of amplifying over 100 targets simultaneously and/or are capable of amplifying targets from low quantities of starting template. Along with these primers, sequencing methods are provided capable of sequencing the targets from numerous individuals, simultaneously. Additionally, methods for analyzing the sequencing results to advance treating an individual are provided.

7 Claims, 15 Drawing Sheets

Specification includes a Sequence Listing.

(56) References Cited

OTHER PUBLICATIONS

Bhattacharjee et al., "Development of DNA Confirmatory and High-Risk Diagnostic Testing for Newborns Using Targeted Next-Generation DNA Sequencing", Genetics in Medicine, vol. 17, Sep. 25, 2014, pp. 337-347, doi:10.1038/gim.2014.117.
Bonini et al., "Small-scale high-throughput sequencing-based identification of new therapeutic tools in cystic fibrosis", Genetics in Medicine, vol. 17, Jan. 8, 2015, pp. 796-806, doi:10.1038/gim.2014.194.
Brownie et al., "The elimination of primer-dimer accumulation in PCR", Nucleic Acids Research, Aug. 1, 1997, vol. 25, No. 16, pp. 3235-3241, https://doi.org/10.1093/nar/25.16.3235.
Cantarel et al., "Analysis of archived residual newborn screening blood spots after whole genome amplification", BMC Genomics, vol. 16, No. 602, Aug. 13, 2015, 6 pgs., DOI 10.0086/s12864-015-1747-2.
Chace et al., "Use of Tandem Mass Spectrometry for Multianalyte Screening of Dried Blood Specimens from Newborns", Clinical Chemistry, vol. 49, No. 11, Nov. 1, 2003, pp. 1797-1817, doi: https://doi.org/10.1373/clinchem.2003.022178.
Depristo et al., "A framework for variation discovery and genotyping using next-generation DNA sequencing data", Nature Genetics, vol. 43, Apr. 10, 2011, pp. 491-498, doi:10.1038/ng.806.
Feng et al., "Improved molecular diagnosis by the detection of exonic deletions with target gene capture and deep sequencing", Genetics in Medicine, Feb. 2015, vol. 17, No. 2, advanced online publication Jul. 17, 2014, pp. 99-107, coi:10.1038/gim.2014.80.
Garrison et al., "Haplotype-based variant detection from short-read sequencing", https://arxiv.org/pdf/1207.3907v2, Jul. 20, 2012, 9 pgs.
Hantash et al., "A large deletion in the CFTR gene in CBAVD", Genetics in Medicine, vol. 8, No. 2, Feb. 2006, pp. 93-95, doi: 10.107/01.gim.0000200945.54234.d7.
Hollegaard et al., "Archived neonatal dried blood spot samples can be used for accurate whole genome and exome-targeted next-generation sequencing", Molecular Genetics and Metabolism, vol. 110, No. 1-2, Sep.-Oct. 2013, pp. 65-72, http://dx.doi.org/10.1016/j.ymge.2013.06.004.
Lefterova et al., "Next-Generation Molecular Testing of Newborn Dried Blood Spots for Cystic Fibrosis", The Journal of Molecular Diagnostics, vol. 18, No. 2, Mar. 1, 2016, pp. 267-282, http://dx.doi.org/10.1016/j.moldx.2015.11.005.
Mamanova et al., "Target-enrichment strategies for next-generation sequencing", Nature Methods, Feb. 2010, vol. 7, pp. 111-118, published online Jan. 28, 2010, corrected after print Apr. 12, 2010, doi: 10.1038/nmeth.1419.
Peng et al., "Combining newborn metabolic and DNA analysis for second-tier testing of methylmalonic acidemia", Genetics in Medicine, Sep. 13, 2018, vol. 21, pp. 896-903, https://doi.org/10.1038s41436-018-0272-5.
Plagnol et al., "A robust model for read count data in exome sequencing experiments and implications for copy number variant calling", Bioinformatics, vol. 28, No. 21, Nov. 1, 2012, pp. 2747-2754, doi: https://doi.org/10.1093/bioinformatics/bts526.
Poulsen et al., "High-Quality Exome Sequencing of Whole Genome Amplified Neonatal Dried Blood Spot DNA", PLoS One, vol. 11, No. 4, e0153253, Apr. 18, 2016, 13 pgs., doi: https://doi.org/10.1371/journal.pone.0153253.

Schouten et al., "Relative quantification of 40 nucleic acid sequences by multiplex ligation-dependent probe amplification", Nucleic Acids Research, vol. 30, No. 12, Jun. 15, 2002, 13 pgs., https://doi.org/10.1093/nar/gnf056.
Schrijver et al., "Multiplex Ligation-Dependent Probe Amplification Identification of Whole Exon and Single Nucleotide Deletions in the CFTR Gene of Hispanic Individuals with Cystic Fibrosis", Journal of Molecular Diagnostics, vol. 10, No. 4, Jul. 2008, pp. 368-375, doi: 10.2353/jmoldx.2008.080004.
Shen et al., "Multiplex target capture with double-stranded DNA probes", Genome Medicine, vol. 5, No. 50, May 29, 2013, 8 pgs., http://genomemedicine.com/content/8/5/50.
Tan et al., "Transplant Virus Detection Using Multiplex Targeted Sequencing", The Journal of Applied Laboratory Medicine, vol. 2, No. 5, Mar. 2018, pp. 757-769, doi: https://doi.org/10.1373/jalm.2017.024521.
Trujillano et al., "Next generation diagnostics of cystic fibrosis and CFTR-related disorders by targeted multiplex high-coverage resequencing of CFTR", Journal of Medical Genetics, 2013, vol. 50, No. 7, published online first May 17, 2013, pp. 455-462, doi:10.1136/jmedgenet-2013-101602.
Turgeon et al., "Combined Newborn Screening for Succinylacetone, Amino Acids, and Acylcarnitines in Dried Blood Spots", Clinical Chemistry, vol. 54, No. 4, Apr. 1, 2008, pp. 657-664, doi: https://doi.org/10.1373/clinchem.2007.101949.
Waisbren et al., "Effect of Expanded Newborn Screening for Biochemical Genetic Disorders on Child Outcomes and Parental Stress", JAMA, vol. 290, No. 19, Nov. 19, 2003, pp. 2564-2572, doi:10.1001/jama.290.19.2564.
Wang et al., "Annovar: functional annotation of genetic variants from high-throughput sequencing data", Nucleic Acids Research, 2010, vol. 38, No. 16, e164, 7 pgs., published online Jul. 3, 2010, doi:10.1093/nar/gkq603.
Watson et al., "Newborn Screening: Toward a Uniform Screening Panel and System—Executive Summary", Pediatrics, vol. 117, Supplement 3, No. 5, May 2006, pp. S296-S307, doi: https://doi.org/10.1542/peds.2005-2633.
Wen et al., "Universal Multiplex PCR: a novel method of simultaneous amplification of multiple DNA fragments", Plant Methods, vol. 8, No. 32, Aug. 15, 2012, 9 pgs., http://www.plantmethods.com/content/8/1/32.
Wilson et al., "A Rapid, High-Quality, Cost-Effective, Comprehensive and Expandable Targeted Next-Generation Sequencing Assay for Inherited Heart Diseases", Circulation Research, vol. 117, No. 7, Sep. 11, 2015, pp. 603-611, doi:https://doi.org/10.1161/CIRCRESAHA.115.306723.
Xu et al., "A Novel Universal Primer-Multiplex-PCR Method with Sequencing Gel Electrophoresis Analysis", PLOS ONE, vol. 7, No. 1, Jan. 17, 2012, 10 pgs., doi: https://doi.org/10.1371/journal.pone.0022900.
Zheng et al., "Anchored multiplex PCR for targeted next-generation sequencing", Nature Medicine, Nov. 10, 2014, vol. 20, pp. 1479-1484, doi:10.1038/nm.3729.
Lefterova et al., "Next-Generation Molecular Testing of Newborn Dried Blood Spots for Cystic Fibrosis", The Journal of Molecular Diagnostics, vol. 18, No. 2, Mar. 2016, pp. 267-282, doi: 10.1016/j.jmoldx.2015.11.005.
Wen et al., "Universal Multiplex PCR: a novel method of simultaneous amplification of multiple DNA fragments", Plant Methods, vol. 8, No. 32, 2012, pp. 1-9, doi: 10.1186/1746-4811-8-32.

* cited by examiner

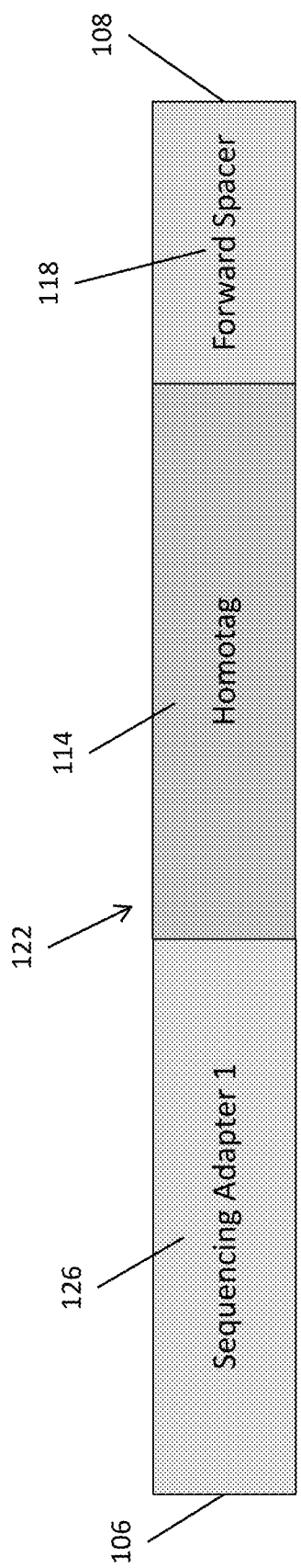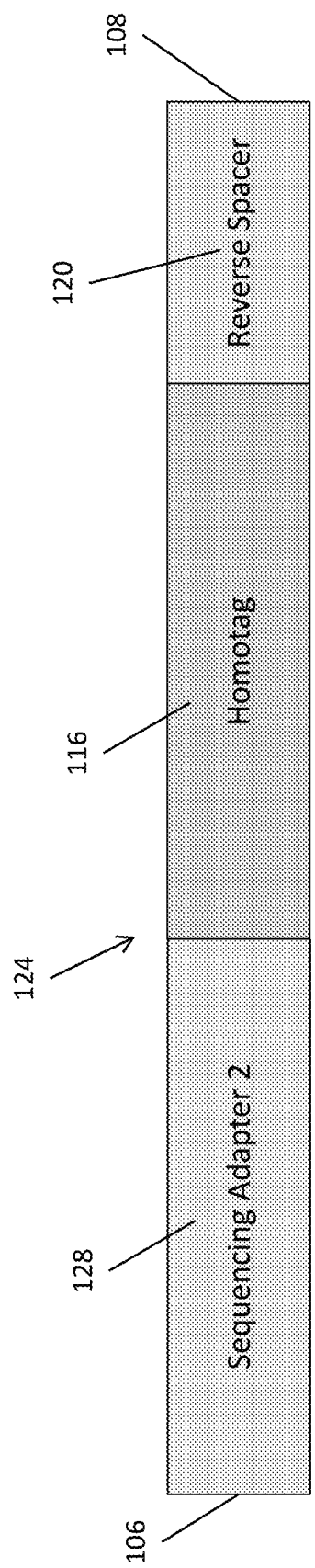
FIG. 4A
FIG. 4B

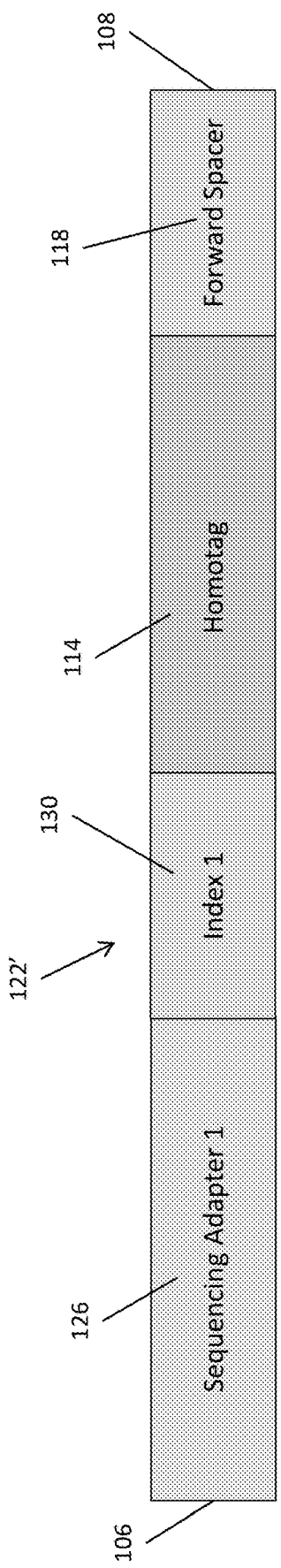
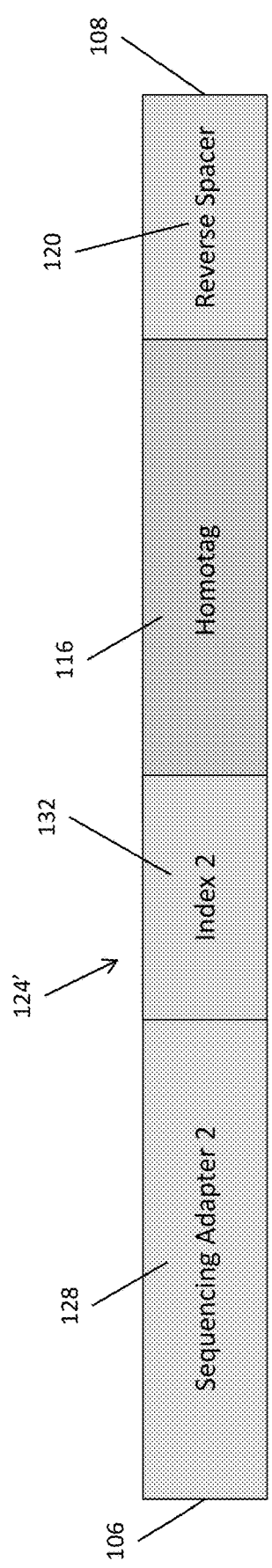
FIG. 4C
FIG. 4D

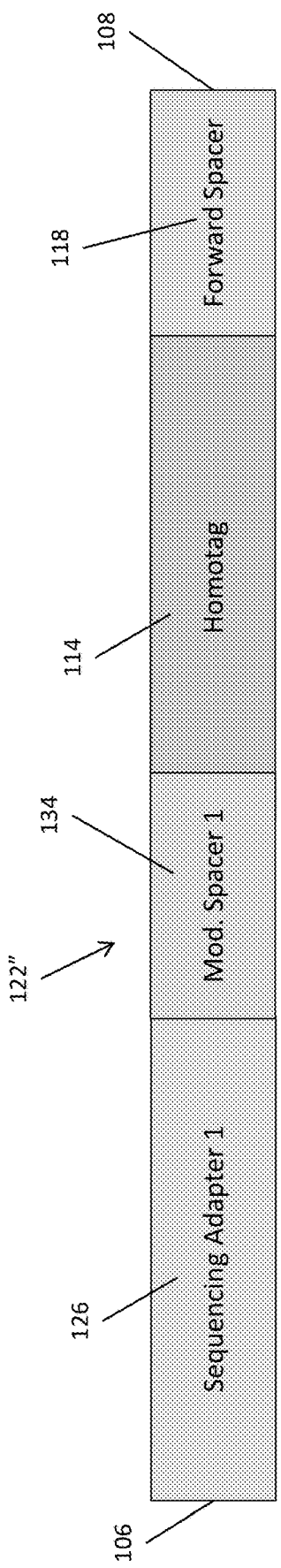
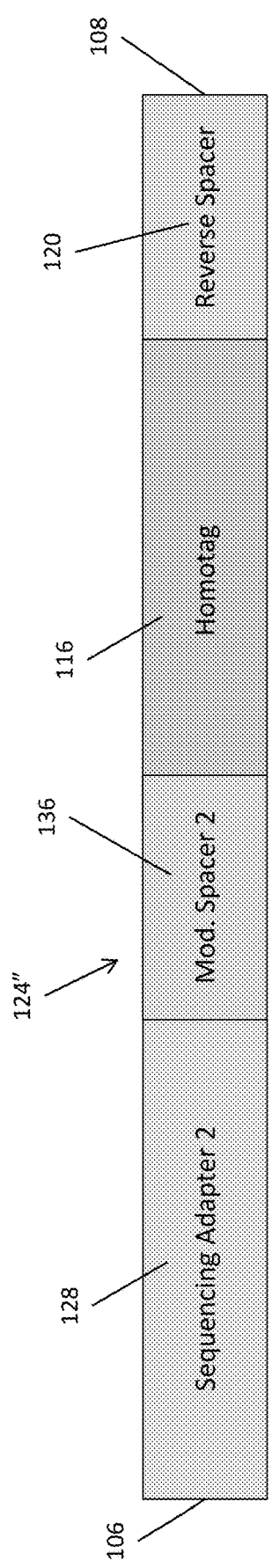
FIG. 5A
FIG. 5B

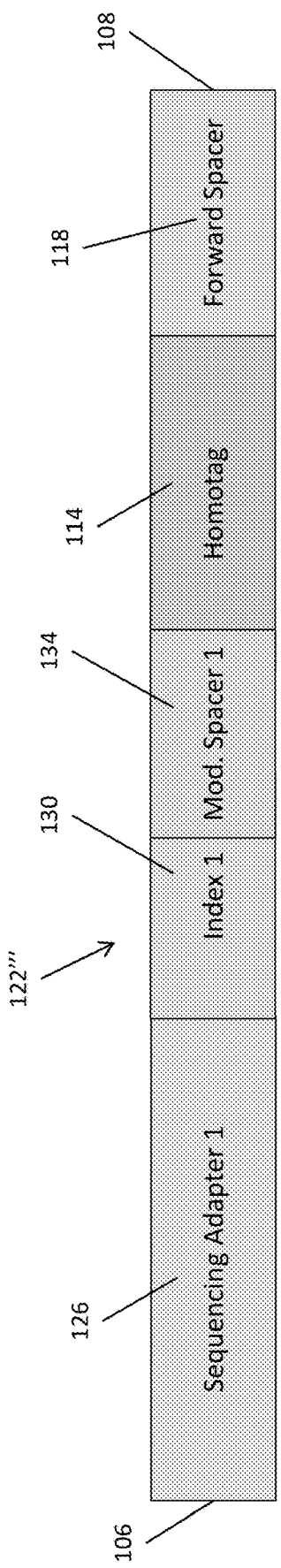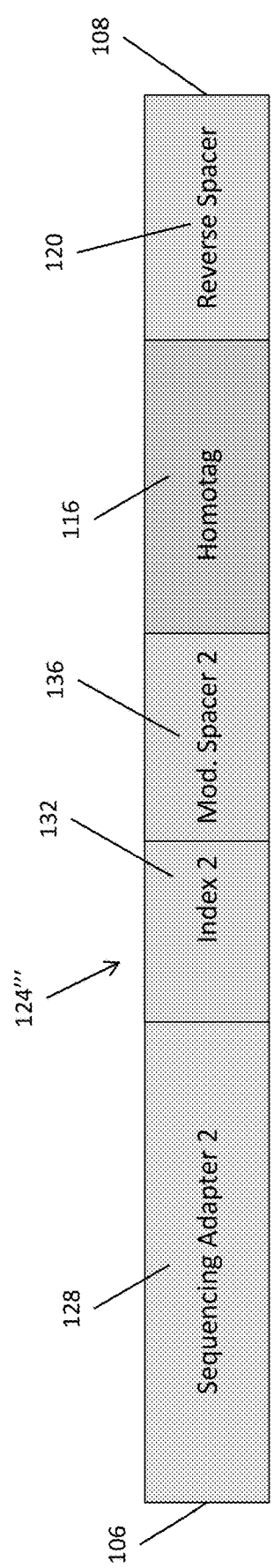
FIG. 5C
FIG. 5D

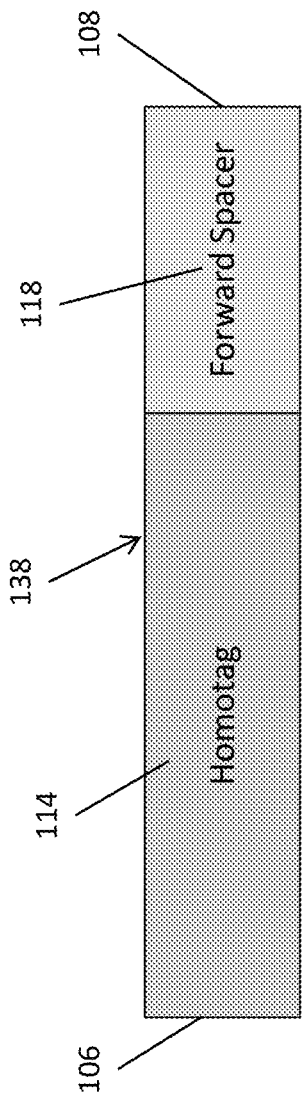
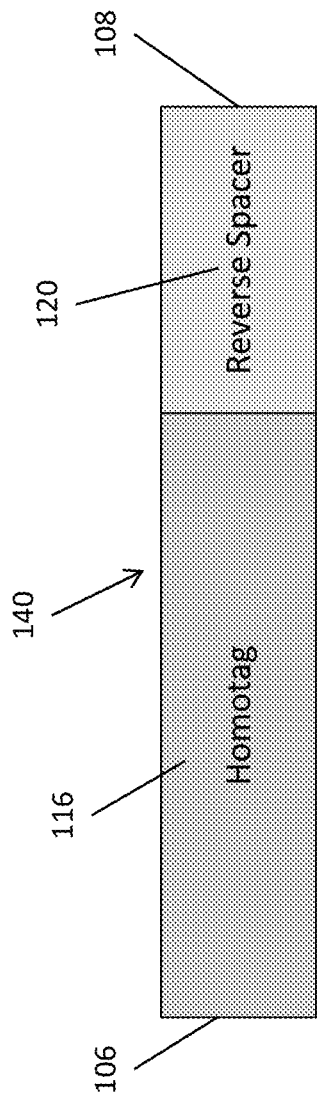
FIG. 6A
FIG. 6B

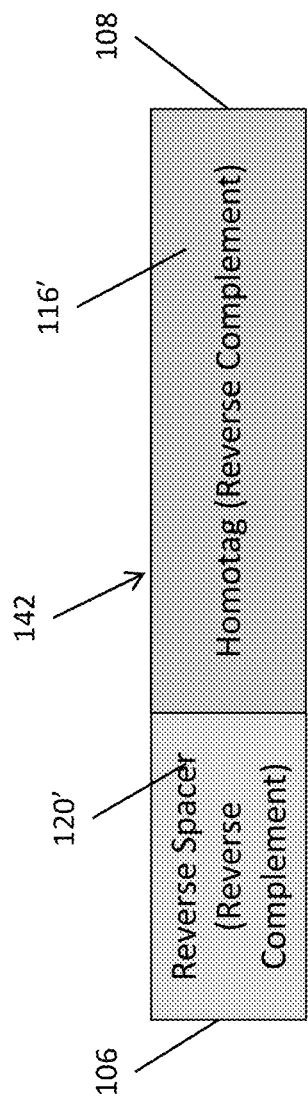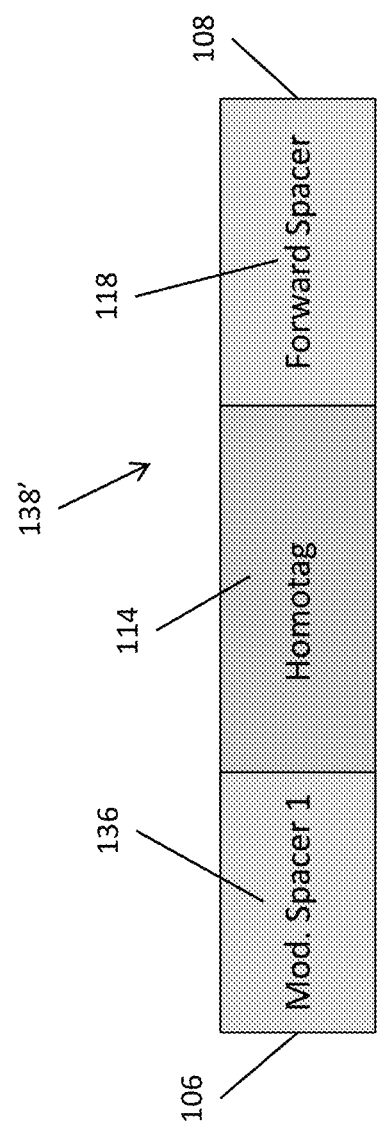

METHODS AND SYSTEMS FOR MULTIPLEX GENE AMPLIFICATION FROM ULTRA-LOW DNA INPUT AMOUNTS AND USES THEREOF

CROSS REFERENCE TO RELATED APPLICATIONS

This application is a national stage of PCT Patent Application No. PCT/US2019/050616, entitled "Methods and Systems for Multiplex Gene Amplification from Ultra-Low DNA Input Amounts and Uses Thereof" to Scharfe et al., filed Sep. 11, 2019, which claims priority to U.S. Provisional Application Ser. No. 62/729,921, entitled "Multiplex Gene Sequencing From Ultra-Low DNA Input Amounts" to Scharfe et al., filed Sep. 11, 2018; the disclosure of which are incorporated herein by reference in their entireties.

STATEMENT REGARDING FEDERALLY SPONSORED RESEARCH OR DEVELOPMENT

This invention was made with Governmental support under Grant No. HD081355 awarded by the National Institute of Health. The government has certain rights in the invention.

SEQUENCE LISTING

This application hereby incorporates by reference the material of the electronic Sequence Listing filed concurrently herewith. The material in the electronic Sequence Listing is submitted as a text (.txt) file entitled "06034_Sequences_ST25.txt" created on Aug. 1, 2019, which has a file size of 876 KB, and is herein incorporated by reference in its entirety.

FIELD OF THE INVENTION

The present invention is directed to polymerase chain reactions (PCR) and applications thereof, more particularly, multiplex PCR methods that allow for simultaneous amplification of multiple target sequences from ultra-low amounts of template nucleic acids.

BACKGROUND OF THE INVENTION

PCR is a commonly used method in biology and medicine for a number of purposes, including mutation detection, identification of individuals, diagnostic testing, genotyping, and nucleic acid sequencing. Current methods typically can only amplify a limited number of target sequences at a time and require large quantities of high-quality starting template (DNA or RNA). Unfortunately, many biological samples, including dried blood spots, possess low quantities of nucleic acids and can be of limited quality, which makes PCR on these samples difficult and nearly impossible for amplifying multiple targets simultaneously. As such, a need in the art exists to develop systems and methods that enable amplification of multiple target sequences in low quality and/or quantity DNA samples.

SUMMARY OF THE INVENTION

Systems and methods for multiplex nucleic acid amplification in accordance with embodiments of the invention are disclosed. In one embodiment, a composition for performing PCR includes a universal primer and a plurality of primer pairs, wherein each primer pair comprises a forward primer and a reverse primer, wherein the forward and the reverse primer comprises a general 5'-A-B-3' structure, where A represents the universal primer sequence and B represents a target specific sequence.

In a further embodiment, the universal primer possesses a melting temperature of approximately 69° C. to approximately 72° C.

In another embodiment, the plurality of primer pairs is at least 50 primer pairs.

In a still further embodiment, the plurality of primer pairs is at least 500 primer pairs.

In still another embodiment, the forward primers and reverse primers further comprise a spacer sequence, C, wherein the forward and reverse primers comprise a general 5'-A-C-B-3' structure.

In a yet further embodiment, the spacer in each forward primer consists of the sequence TCTG and the spacer in each reverse primer consists of the sequence AGAC.

In yet another embodiment, the universal primer and the plurality of primer pairs are at a ratio of 10:1.

In a further embodiment again, the universal primer sequence is SEQ ID: 2818.

In another embodiment again, the target specific sequence for each forward primer in the plurality of forward primers is selected from the group consisting of SEQ ID NOs: 940-1878, and each reverse primer in the plurality of forward primers is selected from the group consisting of SEQ ID NOs: 1879-2817.

In a further additional embodiment, a method of targeted sequencing of an individual, includes the steps of amplifying a plurality of target sequences in a sample using a first PCR reaction to create amplicons containing a universal primer sequence, wherein the first PCR reaction contains a universal primer, a plurality of forward primers, and a plurality of primer pairs, wherein each primer pair comprises a forward primer and a reverse primer, wherein the forward and the reverse primer comprises a general 5'-A-B-3' structure, where A represents the universal primer sequence and B represents a target specific sequence, generating a sequencing library from the amplicons using a second PCR reaction, wherein the second PCR reaction contains sequencing adapter primers comprising a general 5'-D-A-3' structure, where D represents a sequencing adapter sequence and A represents the universal primer sequence, and sequencing the sequencing library on a sequencing platform.

In another additional embodiment, the method includes obtaining a sample.

In a still yet further embodiment, the sample is a dried blood spot.

In still yet another embodiment, the forward primers, reverse primers, and sequencing adapter primers further comprise a spacer sequence, C, wherein the forward and reverse primers comprise a general 5'-A-C-B-3' structure and the sequencing adapter primers comprise a general 5'-D-A-C-3' structure.

In a still further embodiment again, the universal primer possesses a melting temperature of approximately 69° C. to approximately 72° C.

In still another embodiment again, the universal primer and the plurality of primer pairs are at a ratio of 10:1.

In a still further additional embodiment, the universal primer sequence is SEQ ID: 2818.

In still another additional embodiment, the plurality of primer pairs is at least 50 primer pairs.

In a yet further embodiment again, the plurality of primer pairs is at least 500 primer pairs.

In yet another embodiment again, the target specific sequence for each forward primer in the plurality of forward primers is selected from the group consisting of SEQ ID NOs: 940-1878, and each reverse primer in the plurality of forward primers is selected from the group consisting of SEQ ID NOs: 1879-2817.

In a yet further additional embodiment, the sequencing adapter sequence is selected from the group consisting of SEQ ID NOs: 2819-2820.

BRIEF DESCRIPTION OF THE DRAWINGS

These and other features and advantages of the present invention will be better understood by reference to the following detailed description when considered in conjunction with the accompanying drawings where:

FIGS. 4A-4D illustrate primer sequences for a PCR reaction to generate sequencing libraries in accordance with embodiments.

FIGS. 5A-5D illustrate primer sequences for a PCR reaction to generate sequencing libraries in accordance with embodiments.

FIGS. 6A-6C illustrate sequencing reaction primers in accordance with embodiments.

FIGS. 7A-7C illustrate sequencing reaction primers in accordance with embodiments.

DETAILED DISCLOSURE OF THE INVENTION

Figure 1:
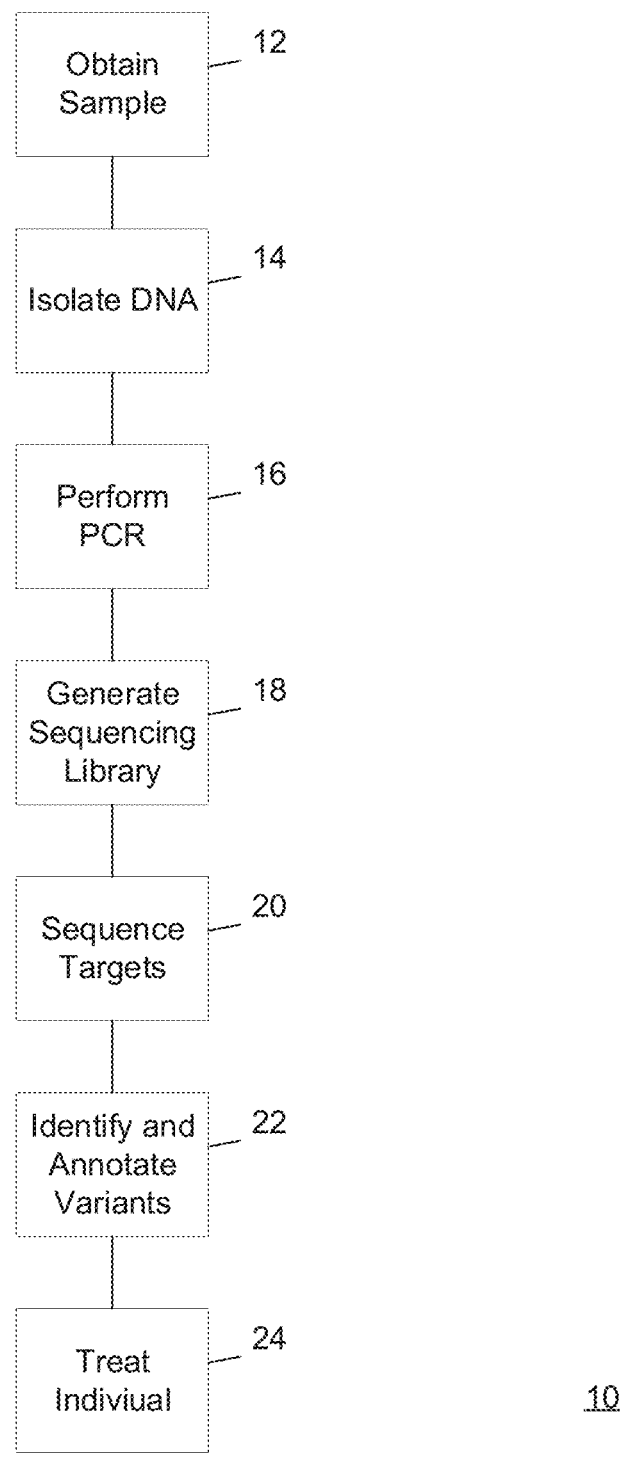
FIG. 1 illustrates a method for obtaining a sample and treating an individual in accordance with embodiments.

The present disclosure may be understood by reference to the following detailed description, taken in conjunction with the drawings as described below. It is noted that, for purposes of illustrative clarity, certain elements in various drawings may not be drawn to scale.

In accordance with the provided disclosure and drawings, systems and methods of performing multiplex PCR on low and ultra-low quantities of starting template using custom primer sequences having a homotag. In some embodiments, these primers are capable of amplifying over 100 targets simultaneously and/or are capable of amplifying targets from low quantities of starting template. Along with these primers, sequencing methods are provided capable of sequencing the targets from numerous individuals, simultaneously. Additionally, methods for analyzing the sequencing results to advance treating an individual are provided.

Traditional genetic testing or screening typically assesses an individual's genetics via hybridization, PCR, or sequencing. In hybridization panels, an individual's DNA is hybridized to a panel of known variants or mutations to identify which variants the individual possesses. While these panels can typically screen for a large number of targets, the panels are limited in that they can only identify variants that have previously been described and/or identified and cannot identify novel or previously unknown variants and can be limited in the ability to detect structural variation.

Similarly, PCR-based methods are typically limited to known variants but also has a number of problems that arise when amplifying multiple targets within a single reaction, including the increased levels of primers needed for the amplification of each target. With the addition of each target sequence, two additional primers need to be added the reaction. Adding additional primers to a reaction increases the likelihood of forming primer dimers or off-target amplification in the reaction, thus inhibiting amplification of the correct target. One solution has been to add additional template nucleic acid (either DNA or RNA) to the sample to increase the likelihood that the primers will amplify the correct sequence. Another solution is to reduce the concentration of the primers, but this strategy suggests a reduction in PCR sensitivity. Current methods of multiplex PCR have only resulted in amplification of a limited number (e.g., less than about 20) of individual targets in a single reaction. Embodiments herein describe a methods and systems to amplify large numbers of target sequences, including amplifying greater than 100, 200, 300, 400, 500, 600, 700, 800, 900, or 1000 targets in a single PCR reaction. Further embodiments are directed to methods of sequencing the amplified targets.

Additionally, some biological samples are limited in quantity and/or lack large quantities of DNA or RNA, thus limiting the ability for an individual to amplify multiple targets in a single reaction. For example, dried blood spots (DBSs) are regularly taken from babies shortly after birth. DBSs provide a chance to assess newborns for genetic health defects, disorders, or diseases at a very early time point, which may be important for early life care. However, DBS samples contain only small and varying amounts of blood, thus the nucleic acid content within a DBS is limited. Adding multiple primer pairs to a reaction with limited input template would quickly overwhelm in the input template and increase the likelihood of primer dimers or other inhibiting structures.

Finally, sequencing is a great alternative by providing full sequence reads and identification of novel variants that could be missing from other panels. However, in genetic testing, typically only a panel of genes or genetic elements are relevant, thus whole genome sequencing would reveal much additional data that may not have any effect on underlying diseases or conditions in an individual. Traditional targeted sequencing typically utilizes a combination of hybridization and PCR to isolate and amplify a subset of targets with added costs in reagents, labor, and equipment. Thus, there exists a need in the art for PCR-based panels to amplify a large number of sequences to reduce costs and improve genetic screening, especially with samples containing low amounts of nucleic acids.

An example of a targeted panel of genes is the Recommended Universal Screening Panel (RUSP), which can detect more than forty metabolic disorders that have historically caused significant morbidity and mortality in children. (See American College of Medical Genetics Newborn Screening Expert G. Newborn screening: toward a uniform screening panel and system—executive summary. Pediatrics. 2006; 117(5 Pt 2): 5296-307; and Urv T K, Parisi M A. Newborn Screening: Beyond the Spot. Adv Exp Med Biol. 2017; 1031:323-346; the disclosures of which are incorporated herein by reference in their entireties.) However, typical RUSP assays in newborns uses tandem mass spectrometry (MS/MS). (See Carreiro-Lewandowski E. Newborn screening: an overview. Clin Lab Sci. 2002; 15(4):229-238; Chace D H, Kalas T A, Naylor E W. Use of tandem mass spectrometry for multianalyte screening of dried blood specimens from newborns. Clinical chemistry. 2003; 49(11): 1797-1817; and Turgeon C, Magera M J, Allard P, et al.

Combined newborn screening for succinylacetone, amino acids, and acylcarnitines in dried blood spots. Clinical chemistry. 2008; 54(4):657-664; the disclosures of which are incorporated herein by reference in their entireties.) While beneficial in most respects, MS/MS screening is tuned to maximize the number of newborns identified, with sensitivity favored over specificity. This approach increases the number of false-positive results, leading to considerable emotional and financial burdens of follow-up testing, unneeded medical precautions for false-positive cases and diagnostic delays for some infants. (See Waisbren S E, et al. Effect of expanded newborn screening for biochemical genetic disorders on child outcomes and parental stress. JAMA. 2003; 290(19):2564-2572; the disclosure of which is incorporated herein by reference in its entirety.) To reduce the number of false-positive cases without compromising sensitivity, screen-positive results are followed by second-tier testing at higher specificity. (See Matern D, et al. Reduction of the false-positive rate in newborn screening by implementation of MS/MS-based second-tier tests: the Mayo Clinic experience (2004-2007). Journal of inherited metabolic disease. 2007; 30(4):585-592; the disclosure of which is incorporated herein by reference in its entirety.) As such, second-tier tests measure more specific disease markers (e.g., organic acids) to confirm (true positive) or reject (false positive) the primary screen result. Second-tier tests are typically not part of the primary screen due to assay complexity, limited throughput, analysis time and cost. (See e.g., Chace D H, Hannon W H. Impact of second-tier testing on the effectiveness of newborn screening. Clinical chemistry. 2010; 56(11):1653-1655; the disclosure of which is incorporated herein by reference in its entirety.) However, both primary and secondary screening utilizes the original newborn DBS to avoid a new blood draw and minimize turnaround time.

The advent of rapid, inexpensive next-generation sequencing (NGS) promises to revolutionize newborn screening. (See e.g., Berg J S, et al. Newborn Sequencing in Genomic Medicine and Public Health. Pediatrics. 2017; 139(2); the disclosure of which is incorporated herein by reference in its entirety.) Incorporating NGS-based analysis at the earliest stage in the screening process could drastically streamline the diagnostic work-up following an abnormal NBS result, but has several challenges. Previous studies using residual DBS for NGS either required large amounts of DBS material, or used whole-genome amplification for sequence library preparation. (See Hollegaard M V, et al. Archived neonatal dried blood spot samples can be used for accurate whole genome and exome-targeted next-generation sequencing. Molecular genetics and metabolism. 2013; 110 (1-2):65-72; Bhattacharjee A, et al. Development of DNA confirmatory and high-risk diagnostic testing for newborns using targeted next-generation DNA sequencing. Genetics in Medicine: official journal of the American College of Medical Genetics. 2015; 17(5):337-347; Cantarel B L, et al. Analysis of archived residual newborn screening blood spots after whole genome amplification. BMC genomics. 2015; 16:602; and Poulsen J B, et al. High-Quality Exome Sequencing of Whole-Genome Amplified Neonatal Dried Blood Spot DNA. PLoS One. 2016; 11(4):e0153253; the disclosures of which are incorporated herein by reference in their entireties.) A less expensive and more efficient approach is multiplex gene sequencing from DBS from a multiplex PCR reaction, using a panel of genes relevant to the specific disease(s) or biological condition(s) detected in primary newborn screening.

Current NGS diagnostics are suboptimal for NBS due to their inability to accommodate DBS-derived material. Newborn DBS samples contain only small and varying amounts of blood, from which multiple punches are taken for NBS for the various conditions on the panel. The small amount of dried blood remaining limits the amount of extractable DNA for use in second-tier testing. Previous studies using residual DBS for NGS either required large amounts of DBS material, or used whole-genome amplification for sequence library preparation. (See Hollegaard M V, et al. Archived neonatal dried blood spot samples can be used for accurate whole genome and exome-targeted next-generation sequencing. Molecular genetics and metabolism. 2013; 110 (1-2):65-72; Bhattacharjee A, et al. Development of DNA confirmatory and high-risk diagnostic testing for newborns using targeted next-generation DNA sequencing. Genetics in medicine: official journal of the American College of Medical Genetics. 2015; 17(5):337-347; Cantarel B L, et al. Analysis of archived residual newborn screening blood spots after whole genome amplification. BMC genomics. 2015; 16:602; and Poulsen J B, et al. High-Quality Exome Sequencing of Whole-Genome Amplified Neonatal Dried Blood Spot DNA. PLoS One. 2016; 11(4):e0153253; the disclosures of which are incorporated herein by reference in their entireties. A more efficient approach is multiplex gene sequencing from DBS, using a panel of genes relevant to the specific condition(s) detected in primary newborn screening, which is incorporated into numerous embodiments. Further Turning to FIG. 1, a method 10 is illustrated that incorporates numerous described herein and how many of the embodiments relate into a larger process. In particular, at Step 12, a sample is obtained. In numerous embodiments, the sample contains nucleic acids (e.g., DNA or RNA). In many embodiments, the sample is a blood sample. In some embodiments, the sample is a DBS. It should be noted that many different samples are known in the art.

At Step 14, DNA is isolated from the sample in numerous embodiments. The DNA may be isolated by any means known in the art that is sufficient for the specific tissue and/or source of the sample. Many embodiments will isolate DNA from a DBS using methods designed to yield the maximum quantity of nucleic acids possible. Methods for isolating DNA from DBSs according to many embodiments are described further in depth below.

At Step 16, a PCR reaction is performed in many embodiments. For some embodiments, the PCR reaction amplifies a single amplicon from the template nucleic acids isolated from the sample. In many embodiments, multiplex PCR reactions are performed to isolate many targets simultaneously. Additional embodiments will utilize unique sequences concatenated to target specific primers to increase amplicon efficiency. Additional details on primer design will be described in detail below.

At Step 18 of many embodiments, a sequencing library or target sequences is generated. In a number of embodiments, the sequencing library is generated using PCR. A sequence library in accordance with embodiments will add specific nucleic acid sequences to allow the target amplicons to be sequenced, such as adapter and index sequences. Numerous embodiments will append Illumina adapters to the amplicons generated from the PCR reaction of Step 16.

The library of target sequences will be sequenced at Step 20 of many embodiments. Many methods and platforms for sequencing nucleic acids are known in the art, many of which will be sufficient for sequencing libraries generated in embodiments herein. However, a number of embodiments will utilize an Illumina platform, such as a MiSeq, HiSeq, HiScan, iSeq, MiniSeq, NextSeq, NovaSeq, and/or any other Illumina platform.

Variants will be identified and annotated in the sequence of many embodiments at Step 22 of many embodiments. Numerous methods exist in the art for identifying variants, including GATK, Annovar, and many other available software packages and/or resources.

At Step 24, many embodiments will treat an individual based on the identified and annotated variants. In many embodiments, the treatments are known in the art for an affliction, condition, and/or disease identified at Step 22.

While the above method 10 contains a number of steps, not all steps are necessary to be performed in all embodiments. Additionally, method 10 is meant to illustrate a number of embodiments that stand alone as separate embodiments, which can be integrated into larger processes, methods, systems, kits, etc. Additionally, numerous embodiments may be able to perform some steps simultaneously, nearly simultaneously, and/or in an order that differs from what is illustrated in FIG. 1.

DNA Isolation

Many embodiments are directed to amplifying target sequences using DBS samples collected from individuals, including newborn babies. As noted above, DBS samples contain limited and varying quantities of DNA. As such, many embodiments isolate DNA from DBS in a method to maximize DNA yield. In some embodiments, one or more punches are taken from a DBS. In several embodiments, a single 3 mm punch is taken from a DBS from one individual. In various embodiments, the punch(es) are washed one or more times with 10 mM NaOH. In numerous embodiments, the punch(es) are suspended in a volume of 10 mM NaOH and heated to allow DNA to elute from the DBS. In various embodiments, the punch(es) is suspended in 50 μL of 10 mM. In certain embodiments, the punch(es) are heated for a period of 5, 10, 15, 20, or 30 minutes at 99° C. Various embodiments will mix and/or transfer the liquid, which contains isolated DNA, to a fresh tube for further processing.

Many embodiments will obtain samples from multiple individuals simultaneously. For example, punches can be taken from 96, 192, or 384 individuals simultaneously to allow DNA isolation using 96-well, 192-well, or 384-well plates.

Multiplex PCR Reactions

Figure 2A:
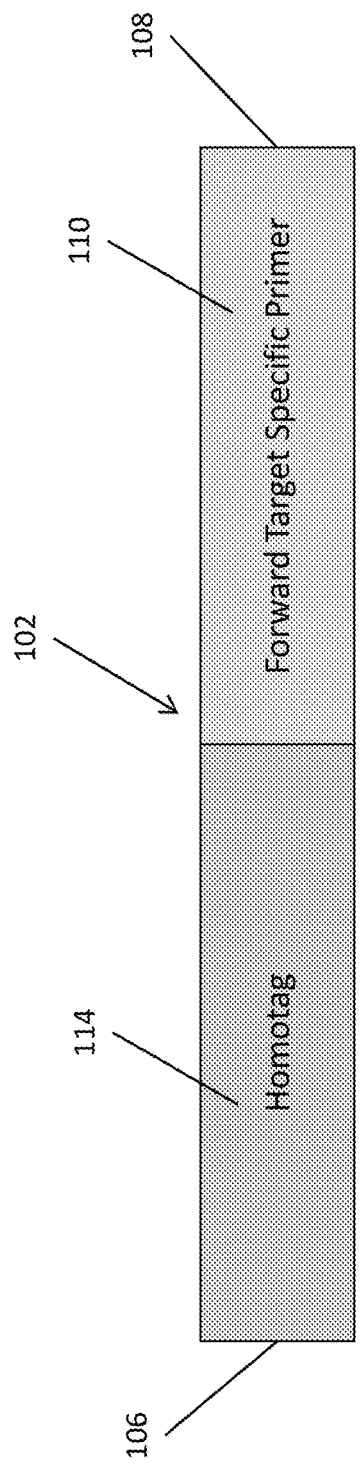
FIGS. 2A-2F illustrate primer sequences for a multiplex PCR reaction in accordance with embodiments.
Figure 2B:
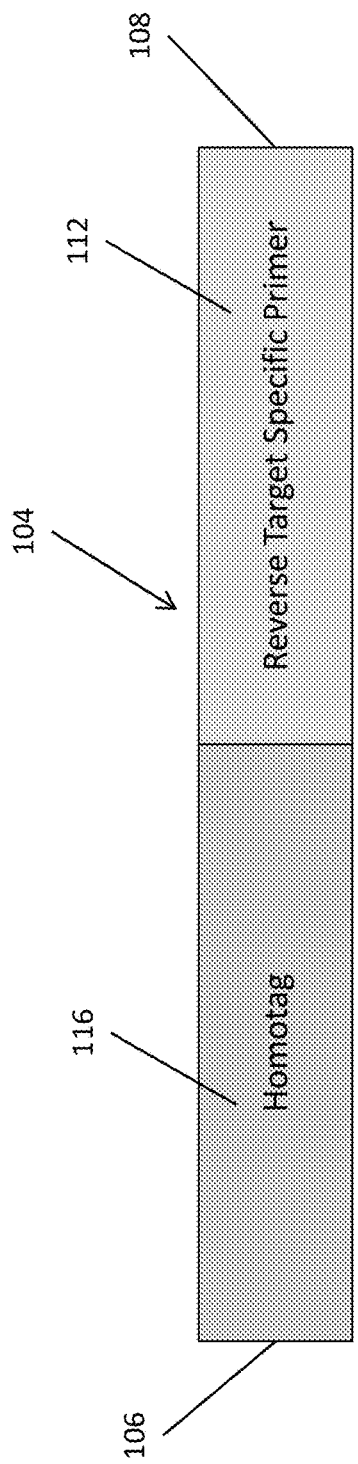

Many embodiments are directed to components and methods for performing PCR reactions. in accordance with many embodiments is described. Turning to FIGS. 2A-2B, forward 102 and reverse 104 PCR primers in accordance with many embodiments are illustrated. The primers 102, 104 start at the 5'-end 106 to the 3'-end 108 of each primer 102, 104. As with many PCR reactions, forward 110 and reverse 112 target specific primers are included in order to frame the target sequence and allow amplification of the target sequence from template nucleic acids. The amplified target molecules are referred to as amplicons. Additionally, homotags 114, 116 are attached at the 5'-ends 106 of the forward 102 and reverse 104 primers. A homotag in accordance with many embodiments is a universal primer that allows amplification of the amplicons independent of the target sequence. In many embodiments, the homotags 114, 116 that are part of the PCR primers 102, 104 possess the same sequence, thus allowing a single-primer amplification of target amplicons. In general, the structure of primers 102, 104 of many embodiments can be described as 5'-A-B-3', where A is a homotag 114, 116, and B is target specific primer 110, 112.

In a number of embodiments, the PCR primers 102, 104 will be designed to avoid aberrant amplification, off-target amplification, and/or other issues that may arise because of poor primer design. When designing PCR primers 102, 104, a number of methods can be utilized, including automation with available software packages. In several embodiments, target sequences, such as entire genes, regions, and/or other significant areas, will be analyzed to avoid problematic sequences, such as repetitive elements. Many of these embodiments will utilize repeat masking software, such as RepeatMasker to block off repetitive elements within these regions. For example, if an entire gene sequence is identified as a target sequence, the target sequence may include introns, exons, 5'-UTRs, 3'UTRs, in addition to other genetic elements. Some of these features can include repetitive sequences that can interfere with PCR if used as a target specific primer 110, 112. By masking these sequences, these regions will not be selected as target specific primers 110, 112. Once certain elements are masked, target specific primer 110, 112 will be designed in many embodiments. The primer design can be performed manually or automated using programs such as Primer3. When multiplexing PCR reactions, the target specific primers 110, 112 are designed to have similar characteristics, such as size, melting temperature, GC content, amplicon size of the resulting amplicon, and any combination thereof. In some embodiments, target specific primers 110, 112 will have an average size of approximately 20-30 base pairs (bp), and amplicon size of approximately 300-500 bp. In several embodiments, the target specific primers 110, 112 will range in size from 21-27 bp and have an average size of 23 bp and amplify targets ranging from 350-500 bp with an average size of 412 bp.

Once designed, the entire sequence of PCR primer 102, 104 can be established, including homotags 114, 116. Once fully designed, additional quality control metrics will be performed in a number of embodiments. For example, sequences for PCR primers 102, 104 can be assessed for primer-dimer formation that can interfere with PCR reactions. Methods for optimizing primer design include the AutoDimer software package to assess secondary structure and/or primer dimer formation within a selection of PCR primer. If primers are predicted to form primer dimers or other interfering structures, the target specific primer sequences 110, 112 can be adjusted and reassessed until primer dimers or other structures are minimized.

In many embodiments, a pool of PCR primers 102, 104 are added in a reaction, where the target specific primers 110, 112 differ for the various targets, but the homotags 114, 116 remain the same. In several embodiments, the PCR primers 102, 104 are tested and optimized to reduce amplicon dropout and/or non-specific amplification. This optimization can include rebalancing a pool of primers (raising or lowering the concentration of specific primer pairs) or by altering the characteristics of the target specific primers 110, 112. It should be noted that one of skill in the art is capable of identifying issues with PCR primers, including dropout and/or non-specific amplification, and would know how to rebalance and/or altering primers within a reaction. In a number of embodiments, primer pairs that amplicons with low GC content will be increased, while primer pairs that amplify amplicons with high GC content will be reduced.

In certain embodiments, the homotags 114, 116 are designed to have a different (e.g., higher or lower) melting temperature than the target specific primers 106, 108. By altering melting temperature of the homotags 114, 116, aberrant amplification is less likely to occur from the presence of the homotags 114, 116. Additional embodiments will design homotags 114, 116 to lack homology with sequences within the genome sequence of a sample to be amplified. Lacking homology with the sample's genome will aid in preventing aberrant or erroneous amplification. Many methods exist for determining which sequences possess or lack homology, including performing alignments of a particular sequence to the sample's reference genome sequence (e.g., using BLAT, BLAST, and/or any other alignment software) or querying a K-mer database. It should also be understood that lacking homology does necessarily not mean possessing no homology with a reference sequence but lacking sufficient homology to prevent amplification under particular PCR reaction conditions.

In numerous embodiments, the homotags 114, 116 will have a higher melting temperature. Having a higher melting temperature for the homotags 114, 116 will allow for amplification of all amplicons using homotag-specific primers without allowing the target specific primers 110, 112 to anneal to template nucleic acids. In such a circumstance, amplicon amplification will occur rather than template amplification—i.e., amplification will be based on amplicons containing homotag sequences rather than generating new amplicons from sample template. It should be noted that because nucleic acid amplification is directional from 5' to 3', homotag-specific primers will have the same sequence as the homotags 114, 116, such as illustrated in FIGS. 2E-2F, where the homotag-specific primers are only the homotag sequences 114, 116.

Figure 2C:
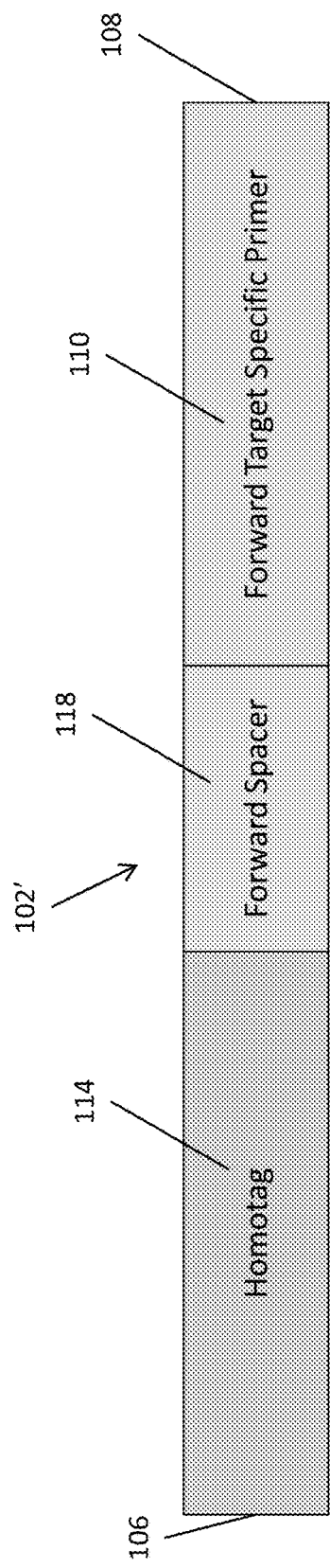
Figure 2D:
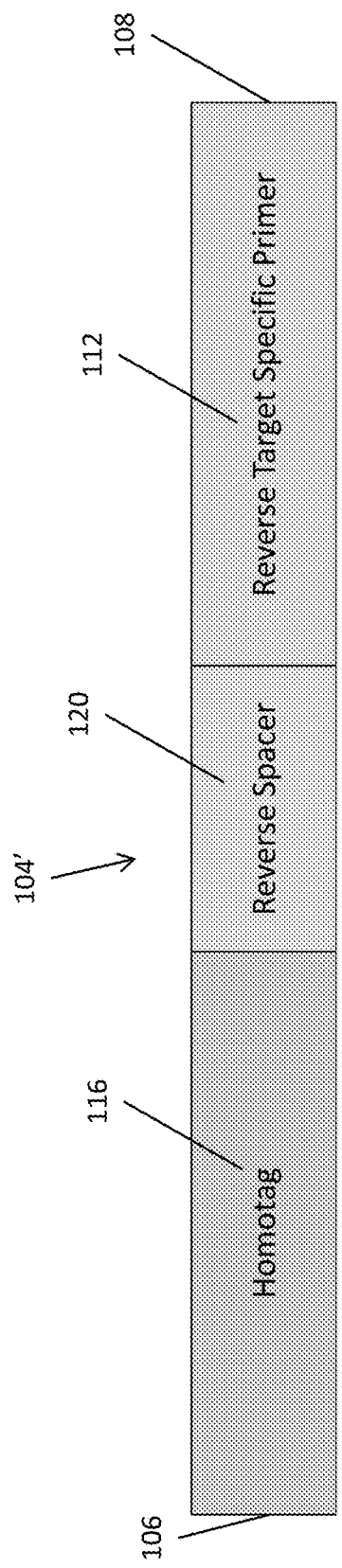
Figure 2E:
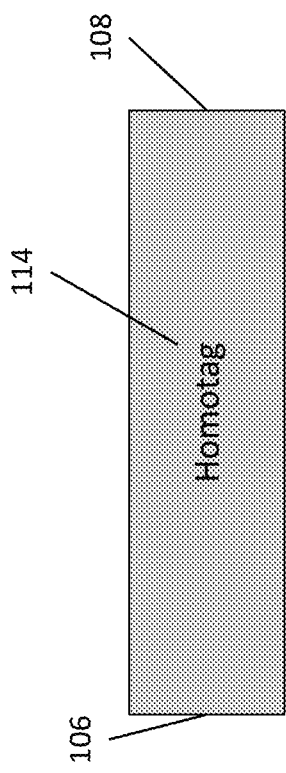
Figure 2F:
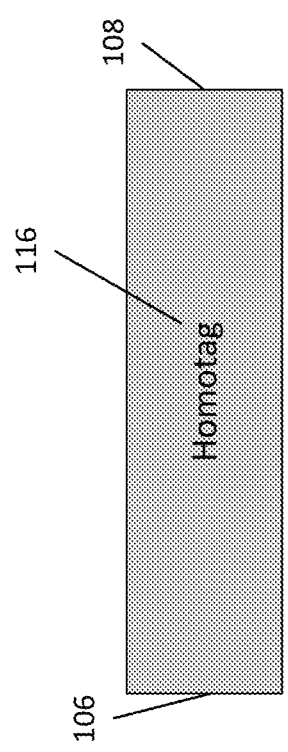

Turning to FIGS. 2C-2D, a number of embodiments will include forward 118 and reverse 120 spacer sequences between homotags 114, 116 and target specific primers 110, 112. Spacer sequences 118, 120 can be used to provide directionality into PCR primers 102', 104'. Spacer sequences 118, 120 can be of any length to allow differentiation in direction. In a number of embodiments, the spacer sequences are 4-8 bp long. In certain embodiments, the spacer sequences are 4 bp sequences. In embodiments including spacers, the primers 102', 104' can be described to have a general structure of 5'-A-C-B-3', where A is a homotag 114, 116, B is a target specific primer 110, 112, and C is a spacer 118, 120.

The RUSP panel contains 60 conditions including 34 core conditions and 26 secondary conditions. In a number of embodiments, the targets are selected based on the RUSP panel. In some embodiments, a panel of 72 genes are selected that include 64 genes associated with 46 different RUSP metabolic disorders and cystic fibrosis and an additional 8 genes associated with 7 metabolic disorders that are not currently in the RUSP metabolic disorders. Table 1 provides a list of conditions selected in some embodiments for use in many embodiments. The list in Table 1 includes conditions currently in the RUSP panel as well as additional conditions that will be selected in certain embodiments. In particular Table 1 identifies specific conditions in a RUSP panel by its ACMG code, the specific condition identified by that code, whether it is a core or secondary condition (if the condition is in the RUSP panel), condition type, genes and NCBI numbers for those genes that are associated with the condition, the current methodologies for determining the condition and the primary analyte for the analysis. Additional information regarding metabolic conditions can be found at www.hrsa.gov/advisory-committees/heritable-disorders/rusp/index.html; the disclosure of which is incorporated by reference in its entirety.

In a number of embodiments targeting the 72 genes as described in Table 2, the specific segments of these genes are selected as target amplicons. In many embodiments, the target amplicons are selected as all exons, flanking intronic regions, and key non-coding regions. In certain embodiments, the targeted amplicons are selected from the group consisting of SEQ ID NOs: 1-939. In a number of embodiments, forward target specific primers 110 are selected from SEQ ID NOs: 940-1878 and reverse target specific primers 112 are selected from SEQ ID NOs: 1879-2817. Table 2 lists specific target names and identifies SEQ ID NOs for the target sequence and correlating forward and reverse target specific primers, where the forward primer SEQ ID NO and the reverse primer SEQ ID NO in a row form a primer pair for the target sequence SEQ ID NO in that same row. For example, SEQ ID NO: 940 and SEQ ID NO: 1879 form a primer pair for SEQ ID NO: 1. It should be noted that the specific sequence for any of the target sequences SEQ ID NOs: 1-939 are only representative of the specific target to be amplified. In many embodiments, variants will exist within the target amplicon for a particular sample, thus one primer pair will amplify a target sequence with at least 75%, 80%, 85%, 90%, 95%, 96%, 97%, 98%, 99%, or 100% identity to a particular target sequence.

In certain embodiments, the homotag is SEQ ID NO: 2818. In some embodiments including spacers 118 and/or 120, the spacers are selected from the 5'-TCTG-3' and 5'-AGAC-3'. In several embodiments of directional PCR primers 102', 104' (e.g., primers including spacers 118, 120) the forward spacer is 5'-TCTG-3', and the reverse spacer is 5'-AGAC-3'. Thus, In many embodiments, the forward PCR primer 102 has a general structure of 5'-X-Y-Z-3', where X is SEQ ID NO: 2818, Y is TCTG, and Z is any one of SEQ ID NOs: 940-1878, and reverse PCR primer 104 has a general structure of 5'-X-Q-R-3', where X is SEQ ID NO: 2818, Q is AGAC, and R is any one of SEQ ID NOs: 1879-2817. Numerous embodiments will pool multiple versions of PCR primers 102 and 104 or directional PCR primers 102' and 104'.

An advantage having homotags 114, 116 with higher melting temperatures is that it will allow for a single reaction set up, which includes PCR primers 102, 104 or directional PCR primers 102', 104' along with homotag-specific primers 114, 116 within the same reaction tube or vessel. In such a circumstance, the reaction will comprise template nucleic acid (e.g., DNA and/or RNA), buffer, water, one or more forward primers, one or more reverse primer, a homotag-specific primer, nucleotide triphosphates (e.g., dNTPs and/or NTPs), a polymerase, and/or any other component known in the art to assist or promote PCR amplification. In many embodiments the pool PCR primers 102, 104 or directional PCR primers 102', 104' will be used at a total concentration of approximately 0.5 µM (e.g., ±0.5 µM), such that some embodiments will utilize 0.1 µM, 0.2 µM, 0.3 µM, 0.4 µM, 0.5 µM, 0.6 µM, 0.7 µM, 0.8 µM, 0.9 µM, or 1.0 µM of total PCR primers 102, 104 or directional PCR primers 102', 104'. The homotag-specific primer 114, 116 will be placed in the reaction tube at a concentration equal to or greater than the concentration of pooled PCR primers 102, 104 or directional PCR primers 102', 104'. As such, many embodiments will use a ratio of homotag-specific primers to PCR primers of 1:1, 2:1, 3:1, 4:1, 5:1, 6:1, 7:1, 8:1, 9:1, 10:1 or greater for the ratio of homotag-specific primers to PCR primers. Many embodiments will use a ratio of 10:1 homotag-specific primers to PCR primers, such that approximately 5 µM of homotag specific primers 114, 116 will be used in a reaction containing approximately 0.5 µM of pooled PCR primers 102, 104 or directional PCR primers 102', 104'.

Many embodiments are directed to DNA polymerization based on a DNA template, so these reactions will comprise a DNA template, buffer, at least one forward primer, at least one reverse primer, a homotag primer, dNTPs, and a polymerase. In many embodiments, the forward and reverse primers will possess a homotag sequence, such as those described herein. In many embodiments, the polymerase will be a DNA polymerase, such as Taq polymerase, while additional embodiments will utilize high fidelity polymerases, strand displacement polymerases, RNA polymerases, long-range polymerases, any other polymerase relevant to the type of reaction, and/or any combination thereof. Numerous embodiments will alter the temperature cycling of the reaction to include a first set of cycles with a lower annealing temperature to allow for template amplification followed by a second set of cycles with a higher annealing temperature to allow for amplicon amplification. For example, the first set of cycles will have an annealing temperature of approximately 50-69° C. followed by a second set of cycles with an annealing temperature of approximately 70-72° C. Additional embodiments will include manipulations to the sets of cycles, such as ramping, touch-down, or any other methodology for amplification. Some specific embodiments utilize the following profile:

95° C. for 3 minutes,
12 cycles of:
   95° C. for 16 seconds,
   69-52° C. for 2 minutes (reducing temperature by 1.5° C. per cycle),
   72° C. for 45 seconds,
10 cycles of:
   95° C. for 16 seconds,
   72° C. for 20 seconds,
   72° C. for 2 minutes.

While the above is described in relation to a single sample, many embodiments will utilize common reaction plates to allow PCR amplification from multiple samples obtained from multiple individuals simultaneously. For example, 96 individual samples can be kept in a standard 96-well plate, which would allow for multiplex PCR reactions to be performed on all 96 samples simultaneously.

Figure 3A:
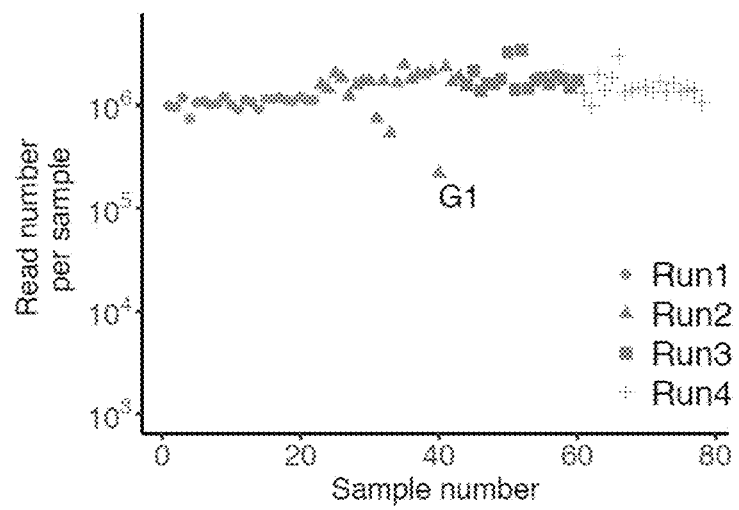
FIGS. 3A-3B illustrate results of multiplex PCR reactions in accordance with embodiments.
Figure 3B:
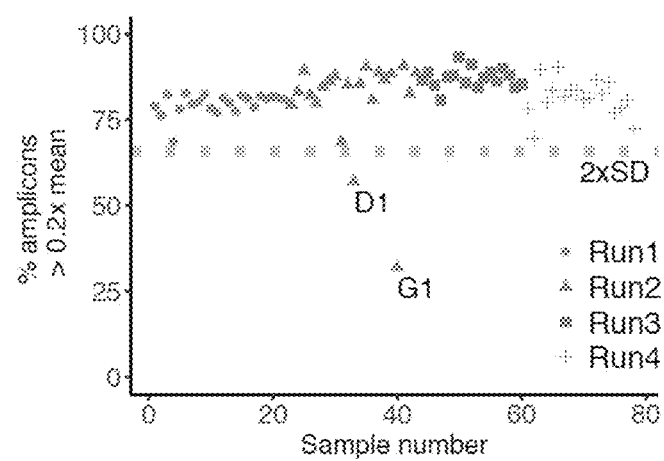

Turning to FIGS. 3A-3B, the success rates of amplifying 939 amplicons are illustrated in accordance with embodiments. Specifically, FIG. 3A illustrates the number of sequencing reads per sample, which indicates the overall success rate of numerous embodiments of multiplex PCR reactions. As seen in FIG. 3A, many samples were capable of producing approximately 1 million reads (e.g., $10^6$ reads). As illustrated, out of 78 samples, only 1 sample produced significantly fewer reads than other samples. Additionally, FIG. 3B illustrates partial failure of multiplex PCR reactions as a function of uniformity, in accordance with many embodiments using DBS as the sample source. In particular, FIG. 3B illustrates the percent of amplicons with at least 20% of the mean coverage of all amplicons. As illustrated in FIG. 3B, only 2 samples out of 78 showed limited uniformity among the amplicons. In combination, FIGS. 3A-3B illustrate that many embodiments are capable of amplifying upwards of 900 amplicons from a very low amount of input nucleic acids.

Generating Sequencing Libraries

Many sequencing library generation methods are known in the art, including commercially prepared kits for building such libraries, such as those from KAPA, Illumina, and other companies. However, many of these kits rely on ligating adapters to the ends of the target molecules rather than purely through PCR. Many embodiments will leverage the power of the homotags or homotags and spacer sequences to generate sequencing libraries for the target sequences.

Upon amplifying target sequences, a number of embodiments will generate sequencing libraries from the amplicons created during a PCR reaction, such as a PCR reaction described above. In certain embodiments, the sequencing libraries are created using a second PCR reaction. In a second reaction, additional primers can utilize the homotags to add additional adapters necessary for sequencing (e.g., Illumina P5 and/or P7 adapters). However, using the homotag sequences alone may not provide adequate representation of all amplicons in a reaction. For example, Illumina sequencing relies on different adapters residing at each end of a molecule to be sequenced. Using only the homotag sequences as primers would create an equal opportunity for the directional Illumina adapters to be added to each end, thus resulting in 50% of all molecules having the same sequencing adapter at each end of the molecule (P5-P5 or P7-P7). As such, many embodiments will utilize spacer sequences to create directionality for adding the sequencing adapters to the amplicons. As such, many adapters will have a structure as illustrated in FIGS. 4A-4B. In FIGS. 4A-4B, sequencing adapter primers 122, 124 utilize the homotag 114 and spacer sequences 118, 120 to amplify the amplicons. By using forward 118 and reverse 120 spacer sequences, attached at the 3'-end 108 of the sequencing adapter primers 122, 124, the system can allow for only one sequencing adapter 126, 128 is added to each end of a molecule. In general, sequencing specific primers 122, 124 can be described to have the structure 5'-D-A-C-3', where D is a sequencing adapter 126, 128, A is a homotag 114, 116, and C is a spacer sequence 118, 120. In many embodiments, the Illumina P5 adapter (SEQ ID NO: 2819) and Illumina P7 adapter (SEQ ID NO: 2820) will be used for the sequencing adapters 126, 128. In some embodiments, the forward sequencing adapter primer 122 will possess the structure 5'-Illumina P5 (SEQ ID NO: 2819)—homotag (SEQ ID NO: 2818)—forward spacer (TCTG)-3', and the reverse sequencing adapter primer 124 will possess the structure 5'-Illumina P7 (SEQ ID NO: 2820)—homotag (SEQ ID NO: 2818)—reverse spacer (AGAC)-3'.

Further embodiments of sequencing adapter primers will include index sequences to allow for multiplex sequencing of multiple samples simultaneously. Many methods are known in the art to index and/or multiplex samples for sequencing. In a number of embodiments, a Nextera-style indexing system is used. Nextera indexing is a system that integrates one or two indexes onto the molecules in a sequencing library. By using two indexes, a specific combination of indexes identifies a single sample. For example, a set of 8 indexes at a first location and a set of 12 indexes at a second location creates 96 unique combinations, thus allowing a total of 20 indexes to uniquely identify 96 individual samples, which can be used for embodiments that have performed PCR reactions on 96 individual samples. Many embodiments will utilize index sequences, as shown in Table 3:

TABLE 3

| List of Indexes | |
|---|---|
| First Indexes | Second Indexes |
| 5'-TAGATCGC-3' | 5'-TCGCCTTA-3' |
| 5'-CTCTCTAT-3' | 5'-CTAGTACG-3' |
| 5'-TATCCTCT-3' | 5'-TTCTGCCT-3' |

TABLE 3-continued

List of Indexes

| First Indexes | Second Indexes |
|---|---|
| 5'-AGAGTAGA-3' | 5'-GCTCAGGA-3' |
| 5'-GTAAGGAG-3' | 5'-AGGAGTCC-3' |
| 5'-ACTGCATA-3' | 5'-CATGCCTA-3' |
| 5'-AAGGAGTA-3' | 5'-GTAGAGAG-3' |
| 5'-CTAAGCCT-3' | 5'-CCTCTCTG-3' |
|  | 5'-AGCGTAGC-3' |
|  | 5'-CAGCCTCG-3' |
|  | 5'-TGCCTCTT-3' |
|  | 5'-TCCTCTAC-3' |

In many embodiments, the indexes shown in Table 3 are integrated between sequencing adapters and the homotags, such as illustrated in FIGS. 4C-4D. In FIGS. 4C-4D, sequencing adapter primers 122', 124' are illustrated. Specifically, FIG. 4C illustrates a first index 130 integrated between sequencing adapters 1 126 and homotag 114, while FIG. 4D illustrates a second index 132 integrated between sequencing adapter 2 128 and homotag 114. In general, sequencing specific primers 122', 124' can be described to have the structure 5'-D-E-A-C-3', where D is a sequencing adapter 126, 128, E is an index sequence 130, 132, A is a homotag 114, 116, and C is a spacer sequence 118, 120. As such, in some embodiments, the forward sequencing adapter primer 122' will possess the structure 5'-Illumina P5 (SEQ ID NO: 2819)—first index (Table 3)—homotag (SEQ ID NO: 2818)—forward spacer (TCTG), and the reverse sequencing adapter primer 124' will possess the structure 5'-Illumina P7 (SEQ ID NO: 2820)—second index (Table 3)—homotag (SEQ ID NO: 2818)—reverse spacer (AGAC)-3'.

However, many embodiments will utilize custom sequencing read primers based on the homotags 114, 116; in some of these embodiments customs sequencing read primers will incorporate homotags 114, 116 and spacers 118, 120. In such embodiments, additional base pairs may be necessary to raise the melting temperature of the sequencing read primers. FIG. 5A illustrates additional sequencing adapter primers 122", 124" that include modifying spacers 134, 136 between sequencing adapters 126, 128 and homotags 114, 116. Additionally, FIG. 5B illustrates sequencing adapter primers 122''', 124''' that include modifying spacers 134, 136 between indexes 130, 132 and homotags 114, 116. In general, the sequencing adapter primers 122", 124" can be described to have the structure 5'-D-F-A-C-3', while sequencing adapter primers 122''', 124''' can be described to have the structure 5'-D-E-F-A-C-3'. In these embodiments, D is a sequencing adapter 126, 128, E is an index sequence 130, 132, F is a modifying spacer 134, 136, A is a homotag 114, 116, and C is a spacer sequence 118, 120.

In many embodiments, the first modifying spacer 134 will be a dinucleotide GG increase the melting temperature of a first sequencing read primer. Additional embodiments will utilize the oligonucleotide CCGTTTA as the second modifying spacer 136 to increase the melting temperature of a second sequencing read primer. As such, some embodiments of the forward sequencing adapter 122" will possess the structure 5'-Illumina P5 (SEQ ID NO: 2819)—first modifying spacer (GG)-homotag (SEQ ID NO: 2818)—forward spacer (TCTG)-3', and the forward sequencing adapter primer 122''' will possess the structure 5'-Illumina P5 (SEQ ID NO: 2819)—first index(Table 3)-first modifying spacer (GG)-homotag (SEQ ID NO: 2818)—forward spacer (TCTG)-3'. Similarly, some embodiments of the reverse sequencing adapter primer 124" will possess the structure 5'-Illumina P7 (SEQ ID NO: 2820)—second modifying spacer (CCGTTTA)-homotag (SEQ ID NO: 2818)—reverse spacer (AGAC)-3', and reverse sequencing adapter primer 124''' will possess the structure 5'-Illumina P7 (SEQ ID NO: 2820)—second index (Table 3)—second modifying spacer (CCGTTTA)-homotag (SEQ ID NO: 2818)—reverse spacer (AGAC)-3'.

Many possible PCR cycling conditions can be used to create the sequencing libraries, based on the enzymes used, the melting temperature of the primers, and the length of the target molecules. In several embodiments the following cycling conditions are used:
  98° C. for 16 seconds,
  13 cycles of:
    98° C. for 16 seconds,
    72° C. for 20 seconds.

In a number of embodiments, the sequencing libraries are cleaned and/or purified after generation. In some embodiments, the cleaning uses commercially available kits, including kits using beads and/or columns. Some embodiments will use AMPure XP beads with a beat to sample ratio of 0.65:1, after which the sequencing libraries are eluted in 50 µL of water.

Further embodiments will size select the library to eliminate too long or too short fragments, which could be generated from primer dimers and/or off target amplification. Many kits exist to perform such size selection, which can be used in embodiments. Some embodiments will utilize a Pippin Prep system for size selection.

Additional embodiments will also quantify the library, which can be accomplished with many means, including UV-Vis spectroscopy, fluorescence, qPCR, and/or electrophoresis. Certain embodiments will perform library quantification using a Bioanalyzer.

Sequencing Targets

As noted above, many possible sequencing platforms can be utilized to sequence targets generated in many embodiments. Also, many embodiments will utilize an Illumina platform to sequence the targets, including an Illumina MiSeq. Sequencing can be performed in any capacity allowed by a particular piece of equipment, including single read, paired-end reads, and/or mate-pair reads. Many embodiments will utilize paired-end read capacity of the platform in order to obtain as much sequence as possible for a particular target, including the entirety of the target sequence.

With such a configuration as illustrated in FIGS. 6A-6C, custom sequencing read primers can utilize the homotags and spacer sequences as custom sequencing read primers. Specifically, FIG. 6A illustrates a first read sequencing primer 138; FIG. 6B illustrates a second read sequencing primer 140 in accordance with many embodiments; and FIG. 6C illustrates an indexing read primer 142, for embodiments including an index. In these embodiments, the sequencing read primers 138, 140 comprise a homotag 114, 116 located at the 5'-end of a spacer sequence 118, 120. In this configuration, the sequencing primers 138, 140 assure directionality of sequencing reads. In general, the sequencing read primers can be described to have the structure 5'-A-C-3', where A is a homotag 114, 116, and C is a spacer sequence 118, 120. In embodiments which include Nextera-style indexes, a separate indexing read is necessary to read a second index. In these embodiments, the indexing read primer 142 is typically a reverse complement of second read sequencing primer 140. This configuration is illustrated in FIG. 6C, which illustrates a reverse complement of reverse spacer 120' at the 5'-end of reverse complement of homotag 116'. Thus, in general, indexing read primer 142 can be described to have the structure 5'-C'-A'-3', where C' is the reverse complement of a reverse spacer 120', and A' is the reverse complement of a homotag 116'. In many embodiments, first sequencing read primer 138 will have the sequence of SEQ ID NO: 2821, which represents the structure 5'-homotag (SEQ ID NO: 2818)—forward spacer (TCTG)-3', and second sequencing read primer 140 will have the sequence of SEQ ID NO: 2822, which represents the structure 5'-homotag (SEQ ID NO: 2818)—reverse spacer (AGAC)-3'. Also, when an indexing read primer 142 is used, it will have the sequence of SEQ ID NO: 2823, which represents the reverse complement of 5'-homotag (SEQ ID NO: 2818)—reverse spacer (AGAC)-3'.

Figure 7B:
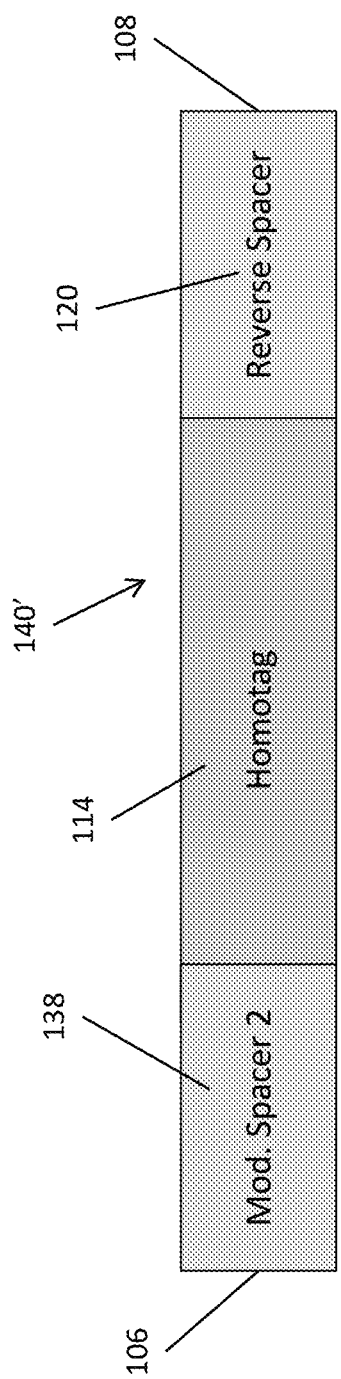
Figure 7C:
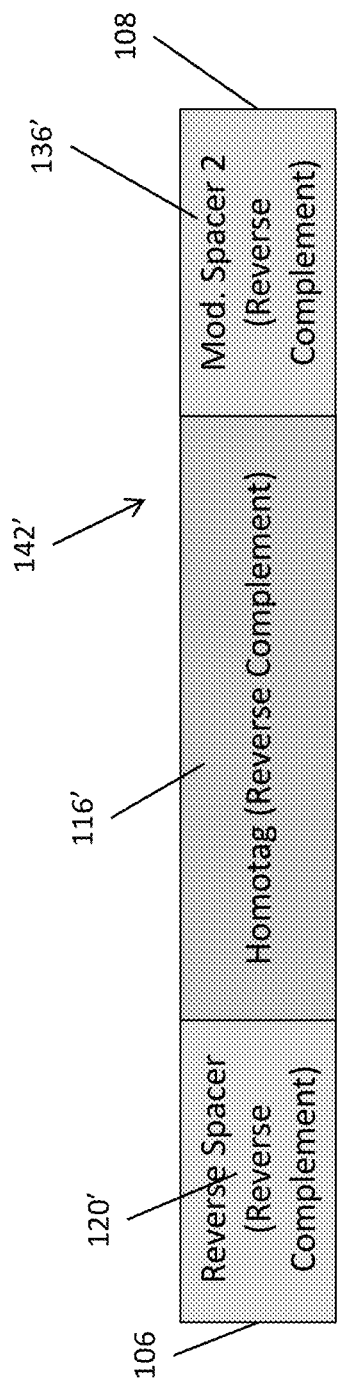

As noted above, some embodiments will include modifying spacers 136, 138 to increase the melting temperature of the sequencing primers. FIGS. 7A-7C illustrate embodiments which include modifying spacers 136, 138 to increase the melting temperature. In particular, FIGS. 7A-7B illustrate sequencing read primers 138', 140' comprising a modifying spacer 136, 138 located at the 5'-end of a homotag 114, 116, which is located at the 5'-end of a spacer sequence 118, 120. In this configuration, the sequencing primers 138, 140 assure directionality of sequencing reads and an increased melting temperature to comply with machine settings, uniformity, or any other relevant factor for ensuring proper sequencing reads. In general, the sequencing read primers can be described to have the structure 5'-F-A-C-3', where F is a modifying spacer 136, 138, A is a homotag 114, 116, and C is a spacer sequence 118, 120. In embodiments which include Nextera-style indexes, a separate indexing read is necessary to read a second index. In these embodiments, the indexing read primer 142' is typically a reverse complement of second read sequencing primer 140'. This configuration is illustrated in FIG. 7C, which illustrates a reverse complement of reverse spacer 120' at the 5'-end of reverse complement of homotag 116', which is located at the 5'-end of reverse complement of a second modifying spacer. Thus, in general, indexing read primer 142' can be described to have the structure 5'-C'-A'-F'-3', where C' is the reverse complement of a reverse spacer 120', A' is the reverse complement of a homotag 116', and F' is the reverse complement of a second modifying spacer 136'. In many embodiments, first sequencing read primer 138' will have the sequence of SEQ ID NO: 2824, which represents the structure 5'-first modifying spacer (GG)-homotag (SEQ ID NO: 2818)—forward spacer (TCTG)-3', and second sequencing read primer 140' will have the sequence of SEQ ID NO: 2825, which represents the structure 5'-second modifying spacer (CCGTTTA)-homotag (SEQ ID NO: 2818)—reverse spacer (AGAC)-3'. Also, when an indexing read primer 142' is used, it will have the sequence of SEQ ID NO: 2826, which represents the reverse complement of 5'-second modifying spacer (CCGTTTA)-homotag (SEQ ID NO: 2818)—reverse spacer (AGAC)-3'.

The raw data from a sequencer can be handled with innate software within the sequencing platform to generate the sequence files, including de-multiplexed sequence files (where multiple samples were multiplexed in the sequencing run). For example, MiSeq Control Software and MiSeq Reporter can analyze the raw image data and de-multiplexing of a run during and/or after a sequencing run has come to completion. Many embodiments will output the sequence in FASTA and/or FASTQ files for further analysis.

Figure 8A:
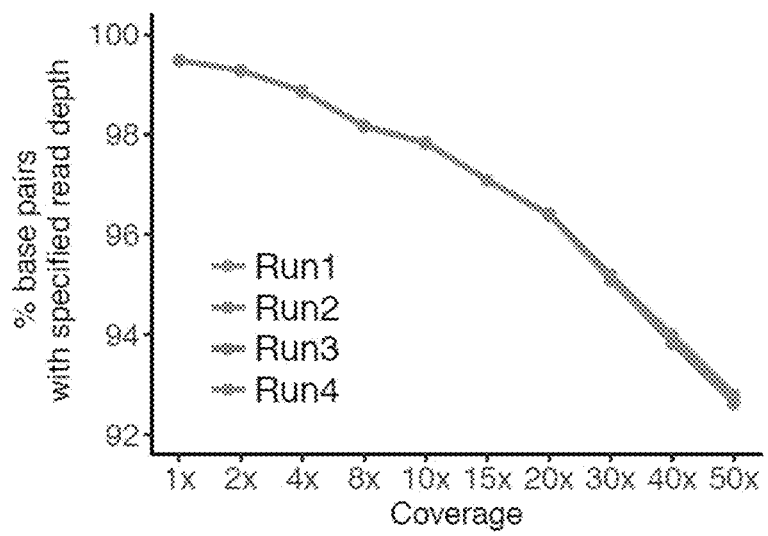
FIGS. 8A-8B illustrate results of sequencing reactions in accordance with embodiments.
Figure 8B:
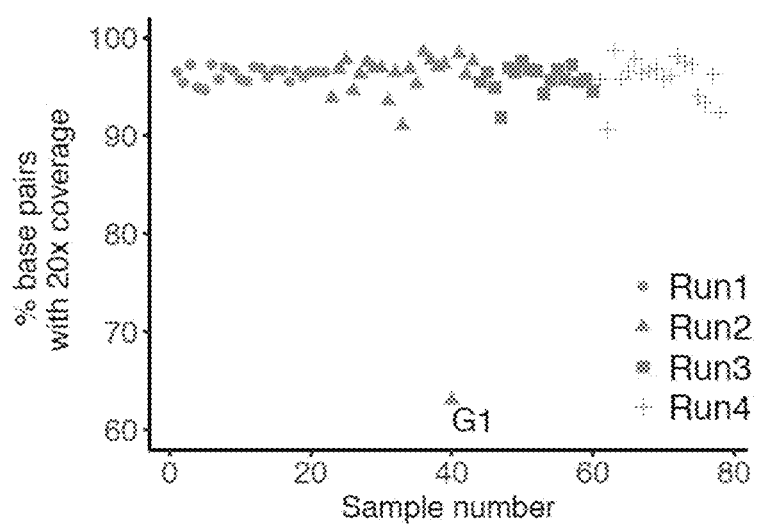

Turning to FIGS. 8A-8B, the success of sequencing libraries generated from embodiments are illustrated. In particular, FIG. 8A illustrates that embodiments produce consistent read depths across multiple sequencing runs. Additionally, FIG. 8B illustrates the success in sequencing individual samples, where the percent of base pairs with greater than 20× coverage are illustrated. As seen in FIG. 8B, most samples tested produced at least 20× coverage in greater than 90% of all bases sequenced, and only 1 sample (out of 78 samples) produced lower read depth.

Identify and Annotate Variants

Once sequences have been generated, as above, the target sequences can be analyzed to identify variants and/or possible genetic conditions associated with these variants. In many embodiments, the sequences for each sample are aligned to a reference genome to identify particular variants. Alignment can be performed using any known software package for performing such alignments, including BLAST, BLAT, BWA, among others. Once sequencing reads are aligned, certain embodiments will identify variants using known software packages, including GATK or similar software packages. Variants in accordance with many embodiments including single nucleotide variants (SNVs), copy number variants (CNVs), and insertion-deletion variants (indels). Once variants are identified, a number of embodiments will annotate the variants for nomenclature and/or disease associations using databases of such information, including HGVS, OMIM, dbSNP, ClinVar, and ExAC. An example of such output can be seen in Table 4. Table 4 illustrates results from an embodiment identifying a sample ID (e.g., specific coordinate on sample plate), underlying genetic condition, and numerous categories identifying genes with multiple pathologic (P) and/or likely pathologic (LP) variants, genes with variants of unknown significance (VUS), and PubMed identifiers for known variants identified. Many embodiments will automate this process by pipelining all analysis beginning from the sequence reads to an output of relevant annotations for an individual.

Figure 9A:
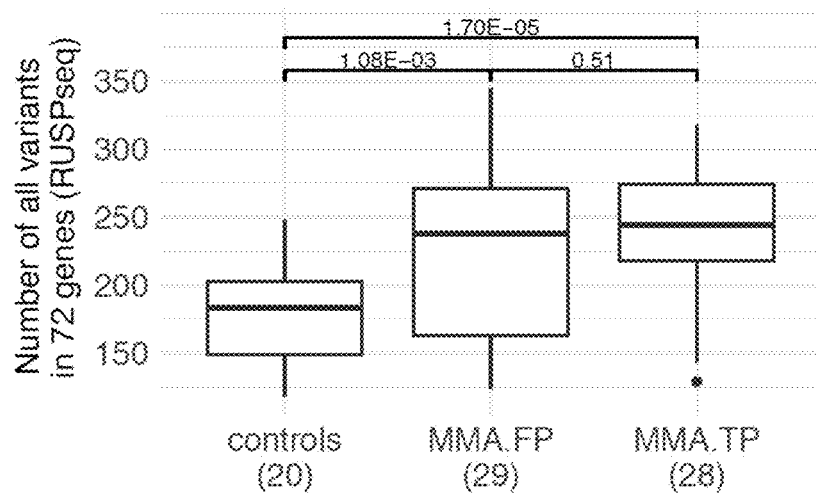
FIGS. 9A-9C illustrate sequence analysis results in accordance with embodiments.
Figure 9B:
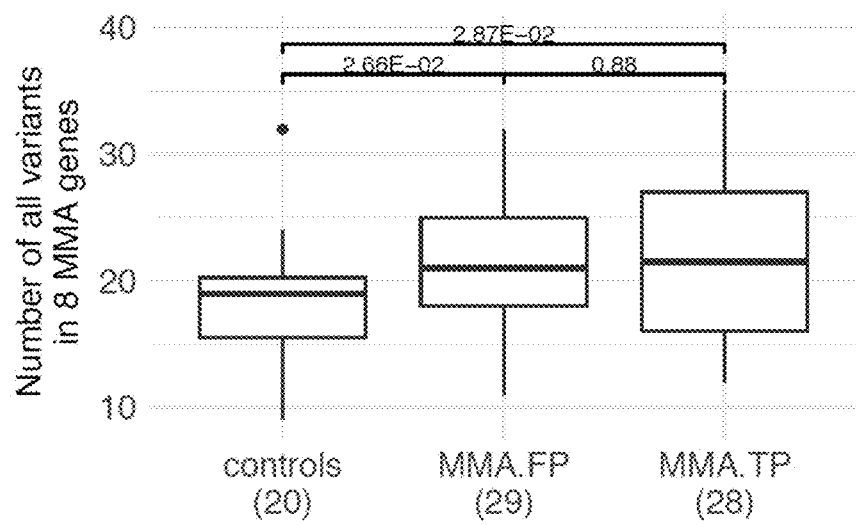
Figure 9C:
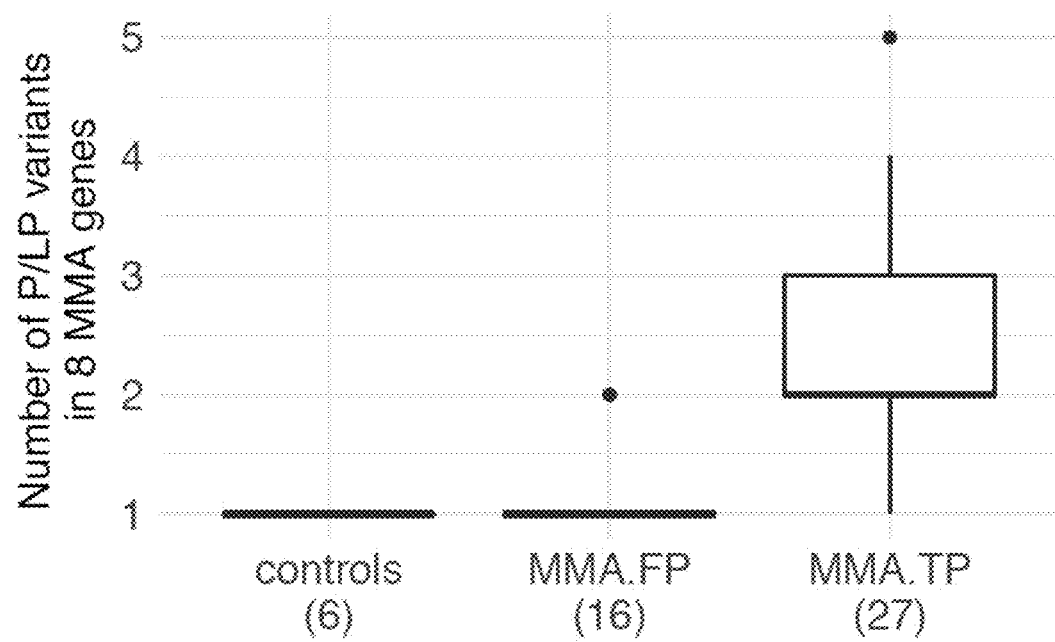

FIGS. 9A-9C summarize variants identified in many embodiments. In particular, FIG. 9A shows the distribution of the number of variants identified in control, false positive (MMA.FP) and true positive (MMA.TP) samples across 72 genes utilized in many embodiments. Similarly, FIG. 9B illustrates the number of variants distribution of the number of variants identified in control, false positive (as identified via MS/MS) (MMA.FP) and true positive (MMA.TP) samples across 8 MMA genes utilized in some embodiments. FIG. 9C illustrates the improvement in numerous embodiments, where pathogenic or likely pathogenic (P/LP) variants were identified in the true positive samples, thus reducing false positive rates, which reducing the demand for second-tier screening for many individuals, which in turn reduces the financial and/or emotional burden of receiving false positive results.

Treatment

In many embodiments, the results of sequencing and/or analysis, such as those described above will guide treatment of an individual. In certain embodiments, the results of the sequencing and/or analysis will be provided to a treating medical provider, such as a physician, nurse, or any other medical professional capable of providing treatment. Upon receiving such information as to metabolic conditions or other genetic diseases, the medical professional can utilize the information to select a treatment and provide the treatment to the individual. In many embodiments, the treatment step is an intervention, such as a drug, device, surgery, or other treatment designed to obviate symptoms and/or indications of the disease or condition, while additional embodiments will provide prophylaxis to the individual to prevent the onset of symptoms and/or complications that can arise due to the presence of a particular disease or condition identified from the sequencing and/or analysis.

EXEMPLARY EMBODIMENTS

Sequencing data supports the notion that embodiments described herein are capable of high plexity PCR amplification of target amplicons from very low nucleic acid inputs. The following data also details the ability to identify numerous metabolic conditions based on the presence of variants identified from target amplification. Accordingly, these data support the various embodiments of the invention as described.

Example 1: Amplifying and Sequencing Optimizing Sulfhydryl Blocking to Produce EVs Background: DBS samples contain small and varying amounts of blood, thus contain very limited amounts of nucleic acids, including DNA. As such, analysis of metabolic diseases, through biochemical or chemical techniques or through genetic analysis is difficult.

Methods: In one exemplary embodiment, multiplex PCR and sequencing were performed for 939 amplicons starting from 80 DBS samples.

Study specimens: Research was approved by the Institutional Review Boards at Yale University (Protocol ID: 1505015917), Stanford University (Protocol ID: 30618) and the State of California Committee for the Protection of Human Subjects (Protocol ID: 13-05-1236). De-identified residual DBS samples from 80 newborns from the California Biobank Program were used to validate the assay of this embodiment. These samples included 30 confirmed MMA cases, 30 MMA screen false-positives, and 20 DBS from healthy controls. In addition, metabolic data from a larger cohort of 803 newborns, consisting of 103 cases with confirmed MMA (24 mut0, 26 mut-, 45 Cbl C, D, or F, 3 Cbl A or B, and 5 unclassified MMA), 502 screen false-positives, and 198 healthy controls were evaluated. All newborns had routine MS/MS metabolic screening performed through the California NBS program between 2005 and 2015. The 56 MS/MS analytes included free carnitine, acylcarnitines, amino acids and calculated ratios. Additional data collected included newborn race/ethnicity, gestational age (GA, in days), birth weight (in grams), total parenteral nutrition (yes or no), and newborn age at blood collection (in hours).

DNA Extraction: A single 3 mm punch was taken from each DBS using a PE Wallac instrument (Perkin Elmer, Santa Clara) and deposited into a 96-well plate. Three blank paper spots were punched between each sample to prevent cross-contamination. DBS punch spots were washed twice with 180 µL of 10 mM NaOH. Each punch spot was then suspended in 50 µL of 10 mM NaOH solution and heated at 99° C. for 15 minutes in an Applied Biosystems GeneAmp PCR System 9700 (Life Technologies, Grand Island, NY). The supernatant, containing eluted DNA, was mixed by pipetting and then transferred to a clean tube containing 50 µL of 20 mM TrisCL pH 7.5. Two samples (D3, C11 in Table 4) of the 80 DBS failed in the DNA extraction.

Primer Design: A custom script integrating the primer design code from Primer 3 was used to generate target-specific forward and reverse primers for 939 amplicons for 362,013 base pairs (bp) of all exons and 20 bp of flanking intronic sequence of 72 genes based on hg19/GRCh37 (Table 2). Primer hybridization sites were selected to avoid common variants found in the National Center for Biotechnology Information (NCBI) single nucleotide polymorphism Database (dbSNP) build 137, June 2012 release. Primers were designed to have similar length (average 23 bp; range 21-27 bp), GC content, and amplicon size (average 412 bp, range 350-450 bp), matching the 2×250 bp paired-end sequencing chemistry on the MiSeq instrument (Illumina, San Diego, CA). Exons larger than 350 bp were covered by overlapping amplicons. Adapter sequences (e.g., homotag sequence SEQ ID NO: 2818) (24 bp) were included at the 5' end of each primer (e.g., SEQ ID NOs: 940-2817) for post-capture amplification.

Multiplex Target Capture: The 939 primer pairs (e.g., primers consisting SEQ ID NO: 2818 coupled to each of SEQ ID NOs: 940-2817) were pooled in one (1) tube for multiplex amplification 5 of 72 genes. Establishing a multiplex reaction in this embodiment required careful primer design and primer pool rebalancing, that included increasing or lowering the concentration of specific primers, replacing of failed primers, sequencing and data analysis. Primer optimization minimized amplicon dropout and non-specific amplification and achieved a 99% target base coverage from <10 ng of DBS DNA. Multiplex PCR was performed in a Veriti 96-well thermal cycler (Applied Biosystem, Foster City, CA) using 4-6 µL of extracted DNA in a 20 µL final volume and the KAPA2G Fast Multiplex PCR Kit (Kapa Biosystems, Wilmington, MA) across the following thermal profile: 95° C. for 3 minutes, 12 cycles of 95° C. for 16 seconds, 69-52° C. (−1.5° C. per cycle) for 2 minutes, and 72° C. for 45 seconds, followed by 10 cycles of 95° C. for 16 seconds, 72° C. for 20 seconds, and 72° C. for 2 minutes. PCR cleanup was performed by adding 14 µL (0.7:1) of AMPure XP beads (Beckman Coulter, Brea, CA) and clean up according to the manufacturer's manual, with a final elution in 14 µL elution buffer.

Sequence Library Construction: 78 samples in four MiSeq runs were sequenced by multiplexing 17 to 22 samples per run. A no-template water control was included in each run. Sequencing library preparation was performed according to the manufacturer's instructions (Illumina, San Diego, CA) using 5 µL of PCR product per sample. PCR was set up in 25 µL reactions, using common primers with sample specific indices and Illumina's P5 (SEQ ID NO: 2819) and P7 (SEQ ID NO: 2820) adapter sequences attached at the 5' end. Samples were barcoded with 8 bp dual indices (Table 3) according to Illumina's index sequencing protocol. KAPA2G Fast Multiplex PCR Kit (Kapa Biosystems, Wilmington, MA) was used to amplify DNA samples with the following cycling conditions: 98° C. for 16 seconds, 13 cycles of 98° C. for 16 seconds and 72° C. for 20 seconds. Following DNA quantification for each sample, samples were pooled (approximately 200-400 µL total volume) and purified using AMPure XP beads 5 (Beckman Coulter, Brea, CA) with a bead to sample ratio of 0.65:1 and eluted in 50 µL. 30 µL of the eluate was used for fragment size selection (440-720 bp) using the Pippin Prep system (Sage Science Inc., Beverly, MA), quantified the NGS library using Agilent Bioanalyzer (Agilent Technologies, Santa Clara, CA), and performed 2×250 bp PE sequencing on MiSeq (Illumina, San Diego, CA).

Sequence Data Analysis: Image analysis and sample de-multiplexing was performed with the Illumina MiSeq Control Software version 2.4.1 and MiSeq Reporter version 2.5.1.3 (Illumina, San Diego, CA). The resulting processed fastq files were aligned to the GRCh38 human reference genome using the Burrows-Wheeler Aligner (BWA-MEM, version 0.7.13-r1126). Picard (version 2.8.1) was used to sort and convert files to BAM format. Quality control (QC) metrics were extracted for each sample from the BAM file, including total number of reads, percent reads that were properly paired and mapped to the reference genome, read depths for each amplicon, and read depth for individual base pairs within the target region (FIGS. 3A-3B and FIGS. 8A-8B). DNA variant calling was performed using GATK (version 3.6-0-g8967209) with parameters as described previously. (See e.g., Lefterova M I, et al. Next-Generation Molecular Testing of Newborn Dried Blood Spots for Cystic Fibrosis. J Mol Diagn. 2016; 18(2):267-282; the disclosure of which is incorporated herein by reference in its entirety.) Annovar was used to annotate variants with the corresponding HGVS DNA and protein level nomenclature in combination with public information relevant for variant annotation from OMIM, dbSNP, ClinVar and ExAC. For each sample (Table 3), sequence variants were classified as pathologic (P), likely pathologic (LP), likely benign, benign, or of unknown significance (VUS) based on ACMG standards and guidelines for interpretation of sequence variants.

Results: This embodiment shows the development of a highly multiplex PCR and NGS method for the analysis of 939 amplicons derived from 72 genes for inborn metabolic disorders from DBS. Out of 80 starting samples, only 2 samples failed the DNA extraction protocol. FIG. 3A illustrates that only 1 of the remaining 78 samples failed in the multiplex PCR reaction, indicating the protocol is robust. Additionally, FIG. 3B illustrates that only 2 samples had partially failed amplification as indicated by 2 standard deviations below the mean depth coverage of all amplicons, one of these samples also failed the total multiplex PCR amplification. Additionally, FIG. 8A illustrates the robustness of embodiments, with consistent read depth across 4 sequencing runs on an Illumina MiSeq. Finally, FIG. 8B illustrates the per-base coverage in all samples. Again, only one sample had significantly lower depth coverage, which is the same sample that failed total and partial amplification. In the end, 77 out of 80 DBS samples were able to proceed to full sequence analysis with greater than 90% of all bases having at least 20× coverage, which provides high confidence for variant calling.

Table 4 summarizes many of the results for the 77 sequenced samples that were successfully sequenced. These 77 samples include 28 MMA patients, of which 25 patients were identified with two variants in an MMA gene, while two patients (B2 and F4) had only one P/LP variant and one patient (F3) had no variant in the eight MMA genes analyzed. In the 29 MMA false-positive cases, two samples (E10 and H10) were detected with two variants in an MMA gene, which in both samples were found in cis on the same amplicon reads and are thus located on the same chromosome. In the 20 control samples, two variants in an MMA gene were not detected. Analysis of the other 64 genes in this embodiment identified samples with two P/LP variants in PAH, PCCA, MTHFR, MLYCD, HPD, ACADVL, FAH, CPS1, DBT, and NAGS. In two 15 samples (B8 and H6) the two P/LP were found on the same chromosome in MLYCD and PAH, respectively.

Conclusion: The results illustrate the ability to amplify very high amounts of amplicons from an ultra-low amount of starting DNA. From the multiplex PCR reaction, sequencing libraries can be constructed to identify variants and underlying metabolic and/or genetic conditions for an individual based on the low levels of starting DNA. While 2 samples failed the DNA extraction protocol, only 1 sample failed the amplification and sequencing reactions, emphasizing the power and robustness of embodiments.

DOCTRINE OF EQUIVALENTS

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

TABLE 1

Curation of 72 metabolic genes
Recommended Uniform Screening Panel (RUSP)*

| ACMG code | Conditions | Category | Condition type | Gene | NCBI Gene | NBS method | Primary analyte |
|---|---|---|---|---|---|---|---|
| PROP | Propionic Acidemia | core | Metab-OA | PCCA | 5095 | DBS, MS/MS | C3 |
| | | | | PCCB | 5096 | | |
| MUT | Methylmalonic Acidemia (mut-0, mut-) | core | Metab-OA | MUT | 4594 | DBS, MS/MS | C3 |
| Cbl-A, B | Methylmalonic Acidemia (Cobalamin disorders) | core | Metab-OA | MMAA | 166785 | DBS, MS/MS | C3 |
| | | | | MMAB | 326625 | | |
| IVA | Isovaleric Acidemia | core | Metab-OA | IVD | 3712 | DBS, MS/MS | C5 |
| 3-MCC | 3-Methylcrotonyl-CoA Carboxylase Deficiency | core | Metab-OA | MCCC1 | 56922 | DBS, MS/MS | C5-OH |
| | | | | MCCC2 | 64087 | | |
| HMG | 3-Hydroxy-3-Methylglutaric Aciduria | core | Metab-OA | HMGCL | 3155 | DBS, MS/MS | C5-OH |
| MCD | Holocarboxylase Synthase deficiency | core | Metab-OA | HLCS | 3141 | DBS, MS/MS | C5-OH |
| | | | | BTD | 686 | | |
| BKT | Beta-Ketothiolase Deficiency | core | Metab-OA | ACAT1 | 38 | DBS, MS/MS | C5-OH |
| GA1 | Glutaric Acidemia Type I | core | Metab-OA | GCDH | 2639 | DBS, MS/MS | C5-DC |
| CUD | Carnitine Uptake Defect/Carnitine Transport Defect | core | Metab-FAO | SLC22A5 | 6584 | DBS, MS/MS | C0 |

TABLE 1-continued

Curation of 72 metabolic genes
Recommended Uniform Screening Panel (RUSP)*

| ACMG code | Conditions | Category | Condition type | Gene | NCBI Gene | NBS method | Primary analyte |
|---|---|---|---|---|---|---|---|
| MCAD | Medium-chain Acyl-CoA Dehydrogenase Deficiency | core | Metab-FAO | ACADM | 34 | DBS, MS/MS | C8 |
| VLCAD | Very Long-chain Acyl-CoA Dehydrogenase Deficiency | core | Metab-FAO | ACADVL | 37 | DBS, MS/MS | C14:1 |
| LCHAD | Long-chain L-3 Hydroxyacyl-CoA Dehydrogenase Deficiency | core | Metab-FAO | HADHA HADHB | 3030 3032 | DBS, MS/MS | C16-OH |
| TFP | Trifunctional Protein Deficiency | core | Metab-FAO | HADHA HADHB | 3030 3032 | DBS, MS/MS | C16-OH |
| ASA | Argininosuccinic Aciduria | core | Metab-AA | ASL | 435 | DBS, MS/MS | Citrulline |
| CIT | Citrullinemia, Type I | core | Metab-AA | ASS1 | 445 | DBS, MS/MS | Citrulline |
| MSUD | Maple Syrup Urine Disease | core | Metab-AA | BCKDHA BCKDHB DBT DLD BCKDK PPM1K | 593 594 1629 1738 10295 152926 | DBS, MS/MS | Leucine, Isoleucine |
| HCY | Homocystinuria | core | Metab-AA | CBS MTHFR MTR MTRR | 875 4524 4548 4552 | DBS, MS/MS | Methionine |
| PKU | Classical Phenylketonuria | core | Metab-AA | PAH | 5053 | DBS, MS/MS | Phenylalanine |
| TYR-I | Tyrosinemia, Type I | core | Metab-AA | FAH | 2184 | DBS, MS/MS | Tyrosine, Succinylacetone |
| BIOT | Biotinidase Deficiency | core | Metab-other | BTD | 686 | DBS, enzyme | Biotinidase |
| CF | Cystic Fibrosis | core | Other-disorder | CFTR | 1080 | DBS, IRT | IRT |
| GALT | Classical Galactosemia | core | Metab-other | GALT | 2592 | DBS, enzyme | Galactose, GALT activity |
| Cbl-C, D | Methylmalonic acidemia with homocystinuria | secondary | Metab-OA | MMACHC MMADHC | 25974 27249 | DBS, MS/MS | C3 |
| MAL | Malonic acidemia | secondary | Metab-OA | MLYCD | 23417 | DBS, MS/MS | C3-DC |
| IBG/IBD | Isobutyrylglycinuria | secondary | Metab-OA | ACAD8 | 27034 | DBS, MS/MS | C4 |
| 2MBG | 2-Methylbutyrylglycinuria | secondary | Metab-OA | ACADSB | 36 | DBS, MS/MS | C5 |
| 3MGA | 3-Methylglutaconic aciduria | secondary | Metab-OA | AUH OPA3 TAZ | 549 80207 131118 | DBS, MS/MS | C5OH |
| 2M3HBA | 2-Methyl-3-hydroxybutyric aciduria | secondary | Metab-OA | HSD17B10 | 3028 | DBS, MS/MS | C5OH |
| SCAD | Short-chain acyl-CoA dehydrogenase deficiency | secondary | Metab-FAO | ACADS | 35 | DBS, MS/MS | C4 |
| M/SCHAD | Medium/short-chain L-3-hydroxyacyl-CoA dehydrogenase deficiency | secondary | Metab-FAO | HADH | 3033 | DBS, MS/MS | C4OH |
| GA-II | Glutaric acidemia type II | secondary | Metab-FOA | ETFA ETFB ETFDH | 2108 2109 2110 | DBS, MS/MS | C4 |
| MCAT | Medium-chain ketoacyl-CoA thiolase deficiency | secondary | Metab-FAO | HADHA HADHB | 3030 3032 | DBS, MS/MS | C16OH |
| CPT-IA | Carnitine palmitoyltransferase type I deficiency | secondary | Metab-FAO | CPT1A | 1374 | DBS, MS/MS | CO/C16 + 18 |
| CPT-II | Carnitine palmitoyltransferase type II deficiency | secondary | Metab-FAO | CPT2 | 1376 | DBS, MS/MS | C16 |
| CACT | Carnitine acylcarnitine translocase deficiency | secondary | Metab-FAO | SLC25A20 | 788 | DBS, MS/MS | C16 |
| ARG | Argininemia | secondary | Metab-AA | ARG1 | 383 | DBS, MS/MS | Arginine |
| CIT-II | Citrullinemia, type II | secondary | Metab-AA | SLC25A13 | 10165 | DBS, MS/MS | Citrulline |
| MET | Hypermethioninemia | secondary | Metab-AA | MAT1A AHCY GNMT | 4143 191 27232 | DBS, MS/MS | Methionine |
| H-PHE | Benign hyperphenylaninemia | secondary | Metab-AA | PAH | 5053 | DBS, MS/MS | Phenylalanine |
| BIOPT(BS) | Biopterin defect in cofactor biosynthesis | secondary | Metab-AA | GCH1 PTS | 2643 5805 | DBS, MS/MS | Phenylalanine |
| BIOPT(REG) | Biopterin defect in cofactor regeneration | secondary | Metab-AA | QDPR PCBD1 | 5860 5092 | DBS, MS/MS | Phenylalanine |
| TYR-II | Tyrosinemia, type II | secondary | Metab-AA | TAT | 6898 | DBS, MS/MS | Tyrosine |

TABLE 1-continued

Curation of 72 metabolic genes
Recommended Uniform Screening Panel (RUSP)*

| ACMG code | Conditions | Category | Condition type | Gene | NCBI Gene | NBS method | Primary analyte |
|---|---|---|---|---|---|---|---|
| TYR-III | Tyrosinemia, type III | secondary | Metab-AA | HPD | 3242 | DBS, MS/MS | Tyrosine |
| GALE | Galactoepimerase deficiency | secondary | Other-disorder | GALE | 2582 | DBS, galactose | Galactose |
| GALK | Galactokinase deficiency | secondary | Other-disorder | GALK1 | 2584 | DBS, galactose | Galactose |

Additional RUSPseq conditions (Not on the RUSP)*

| ACMG code | Conditions | Category | Condition type | Gene | NCBI Gene | NBS method | Primary analyte |
|---|---|---|---|---|---|---|---|
| (OTC) | Ornithine transcarbamylase deficiency | — | Metab-AA | OTC | 5009 | DBS, MS/MS | Citrulline. Screened in CA since 2010. |
| (CPS) | Carbamoyl-phosphate synthetase deficiency | — | Metab-AA | CPS1 | 1373 | — | No NBS. Included due to Hyperammonemia. |
| (NAGSD) | N-acetylglutamate synthase deficiency | — | Metab-AA | NAGS | 162417 | — | No NBS. Included due to Hyperammonemia. |
| (Cbl-F) | Methylmalonic aciduria and homocystinuria, Cbl-F type | — | Metab-OA | LMBRD1 | 55788 | DBS, MS/MS | Related to Cbl-A, B and Cbl-C, D. |
| (CMAMMA) | Combined malonic and methylmalonic aciduria | — | Metab-OA | ACSF3 | 197322 | DBS, MS/MS | No NBS. Included due to MMA. |
| (MCEE) | Methylmalonyl-CoA epimerase deficiency | — | Metab-OA | MCEE | 84693 | DBS, MS/MS | No NBS. Included due to MMA. |
| (NKH) | Nonketotic hyperglycemia | — | Metab-AA | AMT GLDC | 275 2731 | — — | No NBS. Included due to DLD (PDH complex). |

*Reference: www.hrsa.gov/advisory-committees/heritable-disorders/rusp/index.html

TABLE 2

Target and Primer SEQ ID NOs

| Target Name | Target Sequence SEQ ID No | Forward Primer SEQ ID No | Reverse Primer SEQ ID No |
|---|---|---|---|
| ACAD8_exon_1-utr5_1 | 1 | 940 | 1879 |
| ACAD8_exon_2-utr5_1 | 2 | 941 | 1880 |
| ACAD8_exon_4-utr3_4d | 3 | 942 | 1881 |
| ACAD8_exon_5-utr3_6a | 4 | 943 | 1882 |
| ACAD8_exon_5-utr3_6b | 5 | 944 | 1883 |
| ACAD8_exon_5-utr3_6c | 6 | 945 | 1884 |
| ACAD8_exon_5-utr3_6f | 7 | 946 | 1885 |
| ACAD8_exon_6-utr3_1 | 8 | 947 | 1886 |
| ACAD8_exon_7-utr3_1 | 9 | 948 | 1887 |
| ACAD8_exon_8-utr3_19a | 10 | 949 | 1888 |
| ACAD8_exon_8-utr3_19d | 11 | 950 | 1889 |
| ACAD8_exon_8-utr3_19e | 12 | 951 | 1890 |
| ACAD8_exon_8-utr3_19i | 13 | 952 | 1891 |
| ACAD8_exon_9-utr3_3a | 14 | 953 | 1892 |
| ACADM_exon_10-utr3_2a | 15 | 954 | 1893 |
| ACADM_exon_10-utr3_2b | 16 | 955 | 1894 |
| ACADM_exon_11-utr3_3a | 17 | 956 | 1895 |
| ACADM_exon_1-utr5_2b | 18 | 957 | 1896 |
| ACADM_exon_2_1 | 19 | 958 | 1897 |
| ACADM_exon_3_1 | 20 | 959 | 1898 |
| ACADM_exon_4-utr5_3a | 21 | 960 | 1899 |
| ACADM_exon_4-utr5_3b | 22 | 961 | 1900 |
| ACADM_exon_4-utr5_3c | 23 | 962 | 1901 |
| ACADM_exon_5-utr3_1 | 24 | 963 | 1902 |
| ACADM_exon_6-utr5_1 | 25 | 964 | 1903 |
| ACADM_exon_7-utr3_2a | 26 | 965 | 1904 |
| ACADM_exon_7-utr3_3c | 27 | 966 | 1905 |
| ACADM_exon_8-utr3_1 | 28 | 967 | 1906 |
| ACADS_exon_10-utr3_2a | 29 | 968 | 1907 |
| ACADS_exon_1-utr5_1 | 30 | 969 | 1908 |
| ACADS_exon_2_1 | 31 | 970 | 1909 |
| ACADS_exon_3_3a | 32 | 971 | 1910 |
| ACADS_exon_3_3b | 33 | 972 | 1911 |
| ACADS_exon_3_3c | 34 | 973 | 1912 |
| ACADS_exon_4_1 | 35 | 974 | 1913 |
| ACADS_exon_5_1 | 36 | 975 | 1914 |
| ACADS_exon_6_1 | 37 | 976 | 1915 |
| ACADS_exon_7_1 | 38 | 977 | 1916 |
| ACADS_exon_8_1 | 39 | 978 | 1917 |
| ACADS_exon_9_1 | 40 | 979 | 1918 |
| ACADSB_exon_10_1 | 41 | 980 | 1919 |
| ACADSB_exon_11_2a | 42 | 981 | 1920 |
| ACADSB_exon_11_2b | 43 | 982 | 1921 |
| ACADSB_exon_12-utr3_37ab | 44 | 983 | 1922 |
| ACADSB_exon_1-utr5_1 | 45 | 984 | 1923 |
| ACADSB_exon_2_1 | 46 | 985 | 1924 |
| ACADSB_exon_3-utr5_1 | 47 | 986 | 1925 |
| ACADSB_exon_4_1 | 48 | 987 | 1926 |
| ACADSB_exon_5-utr5_1 | 49 | 988 | 1927 |
| ACADSB_exon_6_1 | 50 | 989 | 1928 |
| ACADSB_exon_7_1 | 51 | 990 | 1929 |
| ACADSB_exon_8_1 | 52 | 991 | 1930 |
| ACADSB_exon_9_1 | 53 | 992 | 1931 |
| ACADVL_exon_1-utr5_1 | 54 | 993 | 1932 |
| ACADVL_exon_2_1 | 55 | 994 | 1933 |
| ACADVL_exon_3-utr5_4a | 56 | 995 | 1934 |
| ACADVL_exon_3-utr5_4b | 57 | 996 | 1935 |
| ACADVL_exon_3-utr5_4c | 58 | 997 | 1936 |
| ACADVL_exon_3-utr5_4d | 59 | 998 | 1937 |
| ACADVL_exon_4-utr3_2b | 60 | 999 | 1938 |
| ACADVL_exon_5-utr3_2a | 61 | 1000 | 1939 |
| ACADVL_exon_5-utr3_2b | 62 | 1001 | 1940 |
| ACADVL_exon_6-utr3_2a | 63 | 1002 | 1941 |
| ACADVL_exon_6-utr3_2b | 64 | 1003 | 1942 |
| ACADVL_exon_7-utr3_5a | 65 | 1004 | 1943 |
| ACADVL_exon_7-utr3_5b | 66 | 1005 | 1944 |
| ACADVL_exon_7-utr3_5c | 67 | 1006 | 1945 |
| ACADVL_exon_7-utr3_5d | 68 | 1007 | 1946 |
| ACAT1_exon_10-utr3_15a | 69 | 1008 | 1947 |
| ACAT1_exon_10-utr3_15b | 70 | 1009 | 1948 |

TABLE 2-continued

Target and Primer SEQ ID NOs

| Target Name | Target Sequence SEQ ID No | Forward Primer SEQ ID No | Reverse Primer SEQ ID No |
|---|---|---|---|
| ACAT1_exon_10-utr3_5e | 71 | 1010 | 1949 |
| ACAT1_exon_11_1 | 72 | 1011 | 1950 |
| ACAT1_exon_12_1 | 73 | 1012 | 1951 |
| ACAT1_exon_13-utr3_2a | 74 | 1013 | 1952 |
| ACAT1_exon_1-utr5_1 | 75 | 1014 | 1953 |
| ACAT1_exon_2-utr5_1 | 76 | 1015 | 1954 |
| ACAT1_exon_3-utr5_1 | 77 | 1016 | 1955 |
| ACAT1_exon_4-utr5_1 | 78 | 1017 | 1956 |
| ACAT1_exon_5_1 | 79 | 1018 | 1957 |
| ACAT1_exon_6-utr3_3a | 80 | 1019 | 1958 |
| ACAT1_exon_7-utr3_5d | 81 | 1020 | 1959 |
| ACAT1_exon_8-utr3_1 | 82 | 1021 | 1960 |
| ACAT1_exon_9-utr3_1 | 83 | 1022 | 1961 |
| ACAT1_utr5_1 | 84 | 1023 | 1962 |
| ACSF3_exon_10-utr3_21j | 85 | 1024 | 1963 |
| ACSF3_exon_10-utr3_61ay | 86 | 1025 | 1964 |
| ACSF3_exon_10-utr3_61bv | 87 | 1026 | 1965 |
| ACSF3_exon_10-utr3_61bx | 88 | 1027 | 1966 |
| ACSF3_exon_1-utr5_2a | 89 | 1028 | 1967 |
| ACSF3_exon_1-utr5_2b | 90 | 1029 | 1968 |
| ACSF3_exon_2-utr5_1 | 91 | 1030 | 1969 |
| ACSF3_exon_3_1 | 92 | 1031 | 1970 |
| ACSF3_exon_4_1 | 93 | 1032 | 1971 |
| ACSF3_exon_5_1 | 94 | 1033 | 1972 |
| ACSF3_exon_6-utr3_2a | 95 | 1034 | 1973 |
| ACSF3_exon_7-utr3_1 | 96 | 1035 | 1974 |
| ACSF3_exon_8_1 | 97 | 1036 | 1975 |
| ACSF3_exon_9-utr3_1 | 98 | 1037 | 1976 |
| ACSF3_utr5_5_1 | 99 | 1038 | 1977 |
| AHCY_exon_1-utr5_1 | 100 | 1039 | 1978 |
| AHCY_exon_2-utr5_1 | 101 | 1040 | 1979 |
| AHCY_exon_3_2a | 102 | 1041 | 1980 |
| AHCY_exon_4_1 | 103 | 1042 | 1981 |
| AHCY_exon_5_1 | 104 | 1043 | 1982 |
| AHCY_exon_6_1 | 105 | 1044 | 1983 |
| AHCY_exon_7_1 | 106 | 1045 | 1984 |
| AHCY_exon_8_1 | 107 | 1046 | 1985 |
| AHCY_exon_9-utr3_3a | 108 | 1047 | 1986 |
| AMT_exon_1-utr5_4a | 109 | 1048 | 1987 |
| AMT_exon_1-utr5_4b | 110 | 1049 | 1988 |
| AMT_exon_1-utr5_4c | 111 | 1050 | 1989 |
| AMT_exon_1-utr5_4d | 112 | 1051 | 1990 |
| AMT_exon_2-utr3_6c | 113 | 1052 | 1991 |
| AMT_exon_2-utr3_6d | 114 | 1053 | 1992 |
| AMT_exon_2-utr3_6e | 115 | 1054 | 1993 |
| AMT_exon_2-utr3_6f | 116 | 1055 | 1994 |
| AMT_exon_3-utr3_1 | 117 | 1056 | 1995 |
| AMT_exon_4-utr3_3a | 118 | 1057 | 1996 |
| AMT_exon_4-utr3_3b | 119 | 1058 | 1997 |
| ARG1_exon_1-utr5_1 | 120 | 1059 | 1998 |
| ARG1_exon_2_1 | 121 | 1060 | 1999 |
| ARG1_exon_3_2a | 122 | 1061 | 2000 |
| ARG1_exon_4_1 | 123 | 1062 | 2001 |
| ARG1_exon_5_1 | 124 | 1063 | 2002 |
| ARG1_exon_6_1 | 125 | 1064 | 2003 |
| ARG1_exon_7_1 | 126 | 1065 | 2004 |
| ARG1_exon_8-utr3_2a | 127 | 1066 | 2005 |
| ASL_exon_1_1 | 128 | 1067 | 2006 |
| ASL_exon_10_1 | 129 | 1068 | 2007 |
| ASL_exon_11_1 | 130 | 1069 | 2008 |
| ASL_exon_12_1 | 131 | 1070 | 2009 |
| ASL_exon_13-utr3_8b | 132 | 1071 | 2010 |
| ASL_exon_3_2a | 133 | 1072 | 2011 |
| ASL_exon_3_2b | 134 | 1073 | 2012 |
| ASL_exon_4_1 | 135 | 1074 | 2013 |
| ASL_exon_6_1 | 136 | 1075 | 2014 |
| ASL_exon_7_1 | 137 | 1076 | 2015 |
| ASL_exon_8_1 | 138 | 1077 | 2016 |
| ASL_exon_9_1 | 139 | 1078 | 2017 |
| ASL_processed_transcript_1 | 140 | 1079 | 2018 |
| ASL_utr5_1 | 141 | 1080 | 2019 |
| ASS1_exon_10_1 | 142 | 1081 | 2020 |
| ASS1_exon_11_1 | 143 | 1082 | 2021 |
| ASS1_exon_12_1 | 144 | 1083 | 2022 |
| ASS1_exon_13_1 | 145 | 1084 | 2023 |
| ASS1_exon_14-utr3_1 | 146 | 1085 | 2024 |
| ASS1_exon_1-utr5_1 | 147 | 1086 | 2025 |
| ASS1_exon_2_1 | 148 | 1087 | 2026 |
| ASS1_exon_3_1 | 149 | 1088 | 2027 |
| ASS1_exon_4_1 | 150 | 1089 | 2028 |
| ASS1_exon_5_1 | 151 | 1090 | 2029 |
| ASS1_exon_6_1 | 152 | 1091 | 2030 |
| ASS1_exon_7_1 | 153 | 1092 | 2031 |
| ASS1_exon_8_2b | 154 | 1093 | 2032 |
| ASS1_exon_9_1 | 155 | 1094 | 2033 |
| AUH_exon_10_1 | 156 | 1095 | 2034 |
| AUH_exon_11-utr3_2a | 157 | 1096 | 2035 |
| AUH_exon_1-utr5_1 | 158 | 1097 | 2036 |
| AUH_exon_3_1 | 159 | 1098 | 2037 |
| AUH_exon_4_1 | 160 | 1099 | 2038 |
| AUH_exon_5_1 | 161 | 1100 | 2039 |
| AUH_exon_6_1 | 162 | 1101 | 2040 |
| AUH_exon_8_1 | 163 | 1102 | 2041 |
| AUH_exon_9_1 | 164 | 1103 | 2042 |
| BCKDHA_exon_1_1 | 165 | 1104 | 2043 |
| BCKDHA_exon_10-utr3_2a | 166 | 1105 | 2044 |
| BCKDHA_exon_10-utr3_2b | 167 | 1106 | 2045 |
| BCKDHA_exon_2-utr5_2b | 168 | 1107 | 2046 |
| BCKDHA_exon_3_1 | 169 | 1108 | 2047 |
| BCKDHA_exon_4_1 | 170 | 1109 | 2048 |
| BCKDHA_exon_5_1 | 171 | 1110 | 2049 |
| BCKDHA_exon_6_1 | 172 | 1111 | 2050 |
| BCKDHA_exon_7_1 | 173 | 1112 | 2051 |
| BCKDHA_exon_8_1 | 174 | 1113 | 2052 |
| BCKDHA_exon_9_1 | 175 | 1114 | 2053 |
| BCKDHB_exon_10-utr3_1 | 176 | 1115 | 2054 |
| BCKDHB_exon_11-utr3_8a | 177 | 1116 | 2055 |
| BCKDHB_exon_1-utr5_1 | 178 | 1117 | 2056 |
| BCKDHB_exon_3_1 | 179 | 1118 | 2057 |
| BCKDHB_exon_4_1 | 180 | 1119 | 2058 |
| BCKDHB_exon_5_1 | 181 | 1120 | 2059 |
| BCKDHB_exon_6-utr3_1 | 182 | 1121 | 2060 |
| BCKDHB_exon_7-utr3_1 | 183 | 1122 | 2061 |
| BCKDHB_exon_8-utr3_1 | 184 | 1123 | 2062 |
| BCKDHB_exon_9-utr3_1 | 185 | 1124 | 2063 |
| BCKDHB_processed_transcript_1_1 | 186 | 1125 | 2064 |
| BCKDK_exon_1-utr5_2b | 187 | 1126 | 2065 |
| BCKDK_exon_2_1 | 188 | 1127 | 2066 |
| BCKDK_exon_3_2b | 189 | 1128 | 2067 |
| BCKDK_exon_4_1 | 190 | 1129 | 2068 |
| BCKDK_exon_5_3a | 191 | 1130 | 2069 |
| BCKDK_exon_5_3b | 192 | 1131 | 2070 |
| BCKDK_exon_5_3c | 193 | 1132 | 2071 |
| BCKDK_exon_6-utr3_1 | 194 | 1133 | 2072 |
| BCKDK_exon_7-utr3_3a | 195 | 1134 | 2073 |
| BCKDK_exon_7-utr3_3b | 196 | 1135 | 2074 |
| BCKDK_exon_7-utr3_3c | 197 | 1136 | 2075 |
| BTD_exon_1-utr5_2b | 198 | 1137 | 2076 |
| BTD_exon_2-utr5_1 | 199 | 1138 | 2077 |
| BTD_exon_3-utr5_1 | 200 | 1139 | 2078 |
| BTD_exon_4_1 | 201 | 1140 | 2079 |
| BTD_exon_5-utr3_4a | 202 | 1141 | 2080 |
| BTD_exon_5-utr3_4b | 203 | 1142 | 2081 |
| BTD_exon_5-utr3_4c | 204 | 1143 | 2082 |
| BTD_exon_5-utr3_4d | 205 | 1144 | 2083 |
| CBS_exon_10_2b | 206 | 1145 | 2084 |
| CBS_exon_11_1 | 207 | 1146 | 2085 |
| CBS_exon_12_1 | 208 | 1147 | 2086 |
| CBS_exon_13_1 | 209 | 1148 | 2087 |
| CBS_exon_14-utr3_3a | 210 | 1149 | 2088 |
| CBS_exon_14-utr3_3b | 211 | 1150 | 2089 |
| CBS_exon_15-utr3_2a | 212 | 1151 | 2090 |
| CBS_exon_1-utr5_1 | 213 | 1152 | 2091 |
| CBS_exon_2_1 | 214 | 1153 | 2092 |
| CBS_exon_3_1 | 215 | 1154 | 2093 |
| CBS_exon_4_1 | 216 | 1155 | 2094 |

TABLE 2-continued

Target and Primer SEQ ID NOs

| Target Name | Target Sequence SEQ ID No | Forward Primer SEQ ID No | Reverse Primer SEQ ID No |
|---|---|---|---|
| CBS_exon_5_1 | 217 | 1156 | 2095 |
| CBS_exon_6_1 | 218 | 1157 | 2096 |
| CBS_exon_7_1 | 219 | 1158 | 2097 |
| CBS_exon_8_2a | 220 | 1159 | 2098 |
| CBS_exon_9_1 | 221 | 1160 | 2099 |
| CBS_processed_transcript-retained_intron | 222 | 1161 | 2100 |
| CFTR_exon_1 | 223 | 1162 | 2101 |
| CFTR_exon_10 | 224 | 1163 | 2102 |
| CFTR_exon_11n | 225 | 1164 | 2103 |
| CFTR_exon_12n | 226 | 1165 | 2104 |
| CFTR_exon_13 | 227 | 1166 | 2105 |
| CFTR_exon_14_3a | 228 | 1167 | 2106 |
| CFTR_exon_14_3b | 229 | 1168 | 2107 |
| CFTR_exon_14_3c | 230 | 1169 | 2108 |
| CFTR_exon_15 | 231 | 1170 | 2109 |
| CFTR_exon_16 | 232 | 1171 | 2110 |
| CFTR_exon_17 | 233 | 1172 | 2111 |
| CFTR_exon_18n | 234 | 1173 | 2112 |
| CFTR_exon_19n | 235 | 1174 | 2113 |
| CFTR_exon_20_2a1 | 236 | 1175 | 2114 |
| CFTR_exon_20_2b1 | 237 | 1176 | 2115 |
| CFTR_exon_21 | 238 | 1177 | 2116 |
| CFTR_exon_22_2a | 239 | 1178 | 2117 |
| CFTR_exon_22_2b | 240 | 1179 | 2118 |
| CFTR_exon_23 | 241 | 1180 | 2119 |
| CFTR_exon_24 | 242 | 1181 | 2120 |
| CFTR_exon_25 | 243 | 1182 | 2121 |
| CFTR_exon_26 | 244 | 1183 | 2122 |
| CFTR_exon_27_6a | 245 | 1184 | 2123 |
| CFTR_exon_27_6b | 246 | 1185 | 2124 |
| CFTR_exon_27_6c | 247 | 1186 | 2125 |
| CFTR_exon_27_6d1 | 248 | 1187 | 2126 |
| CFTR_exon_27_6e1 | 249 | 1188 | 2127 |
| CFTR_exon_27_6f | 250 | 1189 | 2128 |
| CFTR_exon_2n1 | 251 | 1190 | 2129 |
| CFTR_exon_3 | 252 | 1191 | 2130 |
| CFTR_exon_4 | 253 | 1192 | 2131 |
| CFTR_exon_5 | 254 | 1193 | 2132 |
| CFTR_exon_6n | 255 | 1194 | 2133 |
| CFTR_exon_7 | 256 | 1195 | 2134 |
| CFTR_exon_8 | 257 | 1196 | 2135 |
| CFTR_exon_9 | 258 | 1197 | 2136 |
| CFTR_intron_12 | 259 | 1198 | 2137 |
| CFTR_intron_target_27b | 260 | 1199 | 2138 |
| CFTR_processed_transcript_3 | 261 | 1200 | 2139 |
| CFTR_promotor | 262 | 1201 | 2140 |
| CFTR_rs139688774 | 263 | 1202 | 2141 |
| CFTR_utr5_1 | 264 | 1203 | 2142 |
| CFTR_utr5_2 | 265 | 1204 | 2143 |
| CPS1_exon_10_1 | 266 | 1205 | 2144 |
| CPS1_exon_11_1 | 267 | 1206 | 2145 |
| CPS1_exon_12-utr5_1 | 268 | 1207 | 2146 |
| CPS1_exon_13-utr5_1 | 269 | 1208 | 2147 |
| CPS1_exon_14_1 | 270 | 1209 | 2148 |
| CPS1_exon_15_1 | 271 | 1210 | 2149 |
| CPS1_exon_16_1 | 272 | 1211 | 2150 |
| CPS1_exon_17_1 | 273 | 1212 | 2151 |
| CPS1_exon_18_1 | 274 | 1213 | 2152 |
| CPS1_exon_19_1 | 275 | 1214 | 2153 |
| CPS1_exon_1-utr5_1 | 276 | 1215 | 2154 |
| CPS1_exon_2_1 | 277 | 1216 | 2155 |
| CPS1_exon_20_1 | 278 | 1217 | 2156 |
| CPS1_exon_21_1 | 279 | 1218 | 2157 |
| CPS1_exon_22_1 | 280 | 1219 | 2158 |
| CPS1_exon_23_1 | 281 | 1220 | 2159 |
| CPS1_exon_24_1 | 282 | 1221 | 2160 |
| CPS1_exon_25_1 | 283 | 1222 | 2161 |
| CPS1_exon_26_1 | 284 | 1223 | 2162 |
| CPS1_exon_27_1 | 285 | 1224 | 2163 |
| CPS1_exon_28_1 | 286 | 1225 | 2164 |
| CPS1_exon_29_1 | 287 | 1226 | 2165 |
| CPS1_exon_3_1 | 288 | 1227 | 2166 |
| CPS1_exon_30_1 | 289 | 1228 | 2167 |
| CPS1_exon_31_1 | 290 | 1229 | 2168 |
| CPS1_exon_32_1 | 291 | 1230 | 2169 |
| CPS1_exon_33_1 | 292 | 1231 | 2170 |
| CPS1_exon_34_1 | 293 | 1232 | 2171 |
| CPS1_exon_35_16p | 294 | 1233 | 2172 |
| CPS1_exon_36_1 | 295 | 1234 | 2173 |
| CPS1_exon_37_1 | 296 | 1235 | 2174 |
| CPS1_exon_38-utr3_4a | 297 | 1236 | 2175 |
| CPS1_exon_4_1 | 298 | 1237 | 2176 |
| CPS1_exon_5_1 | 299 | 1238 | 2177 |
| CPS1_exon_6_1 | 300 | 1239 | 2178 |
| CPS1_exon_7_1 | 301 | 1240 | 2179 |
| CPS1_exon_8_1 | 302 | 1241 | 2180 |
| CPS1_exon_9_1 | 303 | 1242 | 2181 |
| CPS1_utr5_1_1 | 304 | 1243 | 2182 |
| CPT1A_exon_10_1 | 305 | 1244 | 2183 |
| CPT1A_exon_11_1 | 306 | 1245 | 2184 |
| CPT1A_exon_12_1 | 307 | 1246 | 2185 |
| CPT1A_exon_13_1 | 308 | 1247 | 2186 |
| CPT1A_exon_14_1 | 309 | 1248 | 2187 |
| CPT1A_exon_15_1 | 310 | 1249 | 2188 |
| CPT1A_exon_16_1 | 311 | 1250 | 2189 |
| CPT1A_exon_17_1 | 312 | 1251 | 2190 |
| CPT1A_exon_19-utr3_8a | 313 | 1252 | 2191 |
| CPT1A_exon_1-utr5_1 | 314 | 1253 | 2192 |
| CPT1A_exon_2_1 | 315 | 1254 | 2193 |
| CPT1A_exon_20-utr3_1 | 316 | 1255 | 2194 |
| CPT1A_exon_3_1 | 317 | 1256 | 2195 |
| CPT1A_exon_4_1 | 318 | 1257 | 2196 |
| CPT1A_exon_5-utr5_1 | 319 | 1258 | 2197 |
| CPT1A_exon_6-utr5_1 | 320 | 1259 | 2198 |
| CPT1A_exon_8_1 | 321 | 1260 | 2199 |
| CPT1A_exon_9-utr3_1 | 322 | 1261 | 2200 |
| CPT2_exon_1-utr5_2b | 323 | 1262 | 2201 |
| CPT2_exon_2_1 | 324 | 1263 | 2202 |
| CPT2_exon_3_2a | 325 | 1264 | 2203 |
| CPT2_exon_4_4a | 326 | 1265 | 2204 |
| CPT2_exon_4_4b | 327 | 1266 | 2205 |
| CPT2_exon_4_4c | 328 | 1267 | 2206 |
| CPT2_exon_4_4d | 329 | 1268 | 2207 |
| CPT2_exon_5-utr3_3a | 330 | 1269 | 2208 |
| DBT_exon_10_1 | 331 | 1270 | 2209 |
| DBT_exon_11-utr3_1 | 332 | 1271 | 2210 |
| DBT_exon_11-utr3_71ac | 333 | 1272 | 2211 |
| DBT_exon_1-utr5_1 | 334 | 1273 | 2212 |
| DBT_exon_2_1 | 335 | 1274 | 2213 |
| DBT_exon_3_1 | 336 | 1275 | 2214 |
| DBT_exon_4_1 | 337 | 1276 | 2215 |
| DBT_exon_5_1 | 338 | 1277 | 2216 |
| DBT_exon_6_1 | 339 | 1278 | 2217 |
| DBT_exon_7_1 | 340 | 1279 | 2218 |
| DBT_exon_8-utr3_2a | 341 | 1280 | 2219 |
| DBT_exon_8-utr3_2b | 342 | 1281 | 2220 |
| DBT_exon_9_1 | 343 | 1282 | 2221 |
| DLD_exon_10-utr3_1 | 344 | 1283 | 2222 |
| DLD_exon_11-utr3_1 | 345 | 1284 | 2223 |
| DLD_exon_12-utr3_1 | 346 | 1285 | 2224 |
| DLD_exon_13-utr3_19b | 347 | 1286 | 2225 |
| DLD_exon_1-utr5_1 | 348 | 1287 | 2226 |
| DLD_exon_2-utr5_1 | 349 | 1288 | 2227 |
| DLD_exon_3_1 | 350 | 1289 | 2228 |
| DLD_exon_4_1 | 351 | 1290 | 2229 |
| DLD_exon_5-utr5_1 | 352 | 1291 | 2230 |
| DLD_exon_6-utr3_2a | 353 | 1292 | 2231 |
| DLD_exon_6-utr3_2b | 354 | 1293 | 2232 |
| DLD_exon_7-utr3_1 | 355 | 1294 | 2233 |
| DLD_exon_8-utr3_1 | 356 | 1295 | 2234 |
| DLD_exon_9-utr3_1 | 357 | 1296 | 2235 |
| DLD_processed_transcript_1 | 358 | 1297 | 2236 |
| DLD_utr3_1_2b | 359 | 1298 | 2237 |
| ETFA_exon_10-utr3_1 | 360 | 1299 | 2238 |
| ETFA_exon_11-utr3_3a | 361 | 1300 | 2239 |
| ETFA_exon_12-utr3_5e | 362 | 1301 | 2240 |

TABLE 2-continued

Target and Primer SEQ ID NOs

| Target Name | Target Sequence SEQ ID No | Forward Primer SEQ ID No | Reverse Primer SEQ ID No |
|---|---|---|---|
| ETFA_exon_13-utr3_1 | 363 | 1302 | 2241 |
| ETFA_exon_14-utr3_4a | 364 | 1303 | 2242 |
| ETFA_exon_1-utr5_1 | 365 | 1304 | 2243 |
| ETFA_exon_2-utr3_1 | 366 | 1305 | 2244 |
| ETFA_exon_3-utr5_1 | 367 | 1306 | 2245 |
| ETFA_exon_4-utr5_1 | 368 | 1307 | 2246 |
| ETFA_exon_5-utr5_1 | 369 | 1308 | 2247 |
| ETFA_exon_6-utr5_1 | 370 | 1309 | 2248 |
| ETFA_exon_9-utr5_1 | 371 | 1310 | 2249 |
| ETFB_exon_1-utr5_1 | 372 | 1311 | 2250 |
| ETFB_exon_2-utr5_8g | 373 | 1312 | 2251 |
| ETFB_exon_2-utr5_8h | 374 | 1313 | 2252 |
| ETFB_exon_3_1 | 375 | 1314 | 2253 |
| ETFB_exon_5_8e | 376 | 1315 | 2254 |
| ETFB_exon_6-utr3_1 | 377 | 1316 | 2255 |
| ETFDH_exon_10_1 | 378 | 1317 | 2256 |
| ETFDH_exon_11_1 | 379 | 1318 | 2257 |
| ETFDH_exon_12_1 | 380 | 1319 | 2258 |
| ETFDH_exon_13-utr3_4a | 381 | 1320 | 2259 |
| ETFDH_exon_1-utr5_1 | 382 | 1321 | 2260 |
| ETFDH_exon_2_1 | 383 | 1322 | 2261 |
| ETFDH_exon_3_2a | 384 | 1323 | 2262 |
| ETFDH_exon_3_5e | 385 | 1324 | 2263 |
| ETFDH_exon_4-utr5_1 | 386 | 1325 | 2264 |
| ETFDH_exon_5-utr5_1 | 387 | 1326 | 2265 |
| ETFDH_exon_6_1 | 388 | 1327 | 2266 |
| ETFDH_exon_7_1 | 389 | 1328 | 2267 |
| ETFDH_exon_8_1 | 390 | 1329 | 2268 |
| ETFDH_exon_9_1 | 391 | 1330 | 2269 |
| FAH_exon_10_1 | 392 | 1331 | 2270 |
| FAH_exon_11-utr3_1 | 393 | 1332 | 2271 |
| FAH_exon_12-utr3_1 | 394 | 1333 | 2272 |
| FAH_exon_13-utr3_3a | 395 | 1334 | 2273 |
| FAH_exon_1-utr5_6f | 396 | 1335 | 2274 |
| FAH_exon_2-utr5_1 | 397 | 1336 | 2275 |
| FAH_exon_3_1 | 398 | 1337 | 2276 |
| FAH_exon_4_4a | 399 | 1338 | 2277 |
| FAH_exon_5_1 | 400 | 1339 | 2278 |
| FAH_exon_6_1 | 401 | 1340 | 2279 |
| FAH_exon_7_1 | 402 | 1341 | 2280 |
| FAH_exon_8_2a | 403 | 1342 | 2281 |
| FAH_exon_9_1 | 404 | 1343 | 2282 |
| FAH_processed_transcript_1 | 405 | 1344 | 2283 |
| FAH_utr5_2_1 | 406 | 1345 | 2284 |
| GALE_exon_1_3a | 407 | 1346 | 2285 |
| GALE_exon_1_3b | 408 | 1347 | 2286 |
| GALE_exon_1_3c | 409 | 1348 | 2287 |
| GALE_exon_2_1 | 410 | 1349 | 2288 |
| GALE_exon_4_1 | 411 | 1350 | 2289 |
| GALE_exon_5-utr3_4a | 412 | 1351 | 2290 |
| GALE_exon_5-utr3_4b | 413 | 1352 | 2291 |
| GALE_exon_5-utr3_4c | 414 | 1353 | 2292 |
| GALE_exon_5-utr3_4d | 415 | 1354 | 2293 |
| GALK1_exon_1-utr-5_2b | 416 | 1355 | 2294 |
| GALK1_exon_2-utr3_4a | 417 | 1356 | 2295 |
| GALK1_exon_2-utr3_4b | 418 | 1357 | 2296 |
| GALK1_exon_2-utr3_4c | 419 | 1358 | 2297 |
| GALK1_exon_2-utr3_4d | 420 | 1359 | 2298 |
| GALK1_exon_3-utr3_2a | 421 | 1360 | 2299 |
| GALK1_exon_3-utr3_2b | 422 | 1361 | 2300 |
| GALK1_exon_4-utr3_1 | 423 | 1362 | 2301 |
| GALT_exon_1-utr3_4a | 424 | 1363 | 2302 |
| GALT_exon_1-utr3_4b | 425 | 1364 | 2303 |
| GALT_exon_1-utr3_4c | 426 | 1365 | 2304 |
| GALT_exon_1-utr3_4d | 427 | 1366 | 2305 |
| GALT_exon_2-utr3_5a | 428 | 1367 | 2306 |
| GALT_exon_2-utr3_5b | 429 | 1368 | 2307 |
| GALT_exon_2-utr3_5c | 430 | 1369 | 2308 |
| GALT_exon_2-utr3_5d | 431 | 1370 | 2309 |
| GALT_exon_3-utr3_2a | 432 | 1371 | 2310 |
| GCDH_exon_10-utr3_1 | 433 | 1372 | 2311 |
| GCDH_exon_11-utr3_2a | 434 | 1373 | 2312 |
| GCDH_exon_12-utr3_1 | 435 | 1374 | 2313 |
| GCDH_exon_1-utr5_1 | 436 | 1375 | 2314 |
| GCDH_exon_2-utr3_2a | 437 | 1376 | 2315 |
| GCDH_exon_3-utr3_4a | 438 | 1377 | 2316 |
| GCDH_exon_5_2a | 439 | 1378 | 2317 |
| GCDH_exon_6-utr3_1 | 440 | 1379 | 2318 |
| GCDH_exon_7-utr3_1 | 441 | 1380 | 2319 |
| GCDH_exon_8-utr3_1 | 442 | 1381 | 2320 |
| GCDH_exon_9-utr3_2a | 443 | 1382 | 2321 |
| GCDH_exon_9-utr3_2b | 444 | 1383 | 2322 |
| GCH1_exon_1-utr5_2a | 445 | 1384 | 2323 |
| GCH1_exon_1-utr5_2b | 446 | 1385 | 2324 |
| GCH1_exon_2_1 | 447 | 1386 | 2325 |
| GCH1_exon_3_1 | 448 | 1387 | 2326 |
| GCH1_exon_4_1 | 449 | 1388 | 2327 |
| GCH1_exon_5_1 | 450 | 1389 | 2328 |
| GCH1_exon_6-utr3_6a | 451 | 1390 | 2329 |
| GCH1_exon_6-utr3_6b | 452 | 1391 | 2330 |
| GCH1_exon_6-utr3_6c | 453 | 1392 | 2331 |
| GCH1_exon_6-utr3_6d | 454 | 1393 | 2332 |
| GLDC_exon_10_1 | 455 | 1394 | 2333 |
| GLDC_exon_11_1 | 456 | 1395 | 2334 |
| GLDC_exon_12_1 | 457 | 1396 | 2335 |
| GLDC_exon_13_1 | 458 | 1397 | 2336 |
| GLDC_exon_14_1 | 459 | 1398 | 2337 |
| GLDC_exon_15_1 | 460 | 1399 | 2338 |
| GLDC_exon_16_1 | 461 | 1400 | 2339 |
| GLDC_exon_17_2a | 462 | 1401 | 2340 |
| GLDC_exon_18_1 | 463 | 1402 | 2341 |
| GLDC_exon_19_1 | 464 | 1403 | 2342 |
| GLDC_exon_1-utr5_2a | 465 | 1404 | 2343 |
| GLDC_exon_1-utr5_2b | 466 | 1405 | 2344 |
| GLDC_exon_2_1 | 467 | 1406 | 2345 |
| GLDC_exon_20_1 | 468 | 1407 | 2346 |
| GLDC_exon_21_1 | 469 | 1408 | 2347 |
| GLDC_exon_22_1 | 470 | 1409 | 2348 |
| GLDC_exon_23_1 | 471 | 1410 | 2349 |
| GLDC_exon_24_1 | 472 | 1411 | 2350 |
| GLDC_exon_25-utr3_2a | 473 | 1412 | 2351 |
| GLDC_exon_3_1 | 474 | 1413 | 2352 |
| GLDC_exon_4_1 | 475 | 1414 | 2353 |
| GLDC_exon_5_1 | 476 | 1415 | 2354 |
| GLDC_exon_6_1 | 477 | 1416 | 2355 |
| GLDC_exon_7_1 | 478 | 1417 | 2356 |
| GLDC_exon_8_1 | 479 | 1418 | 2357 |
| GLDC_exon_9_1 | 480 | 1419 | 2358 |
| GNMT_exon_1-utr5_1 | 481 | 1420 | 2359 |
| GNMT_exon_2_1 | 482 | 1421 | 2360 |
| GNMT_exon_3_1 | 483 | 1422 | 2361 |
| GNMT_exon_4_1 | 484 | 1423 | 2362 |
| GNMT_exon_5_1 | 485 | 1424 | 2363 |
| GNMT_exon_6-utr3_1 | 486 | 1425 | 2364 |
| HADH_exon_10-utr3_3a | 487 | 1426 | 2365 |
| HADH_exon_1-utr5_1 | 488 | 1427 | 2366 |
| HADH_exon_2-utr5_1 | 489 | 1428 | 2367 |
| HADH_exon_3_1 | 490 | 1429 | 2368 |
| HADH_exon_4_1 | 491 | 1430 | 2369 |
| HADH_exon_5_1 | 492 | 1431 | 2370 |
| HADH_exon_6_1 | 493 | 1432 | 2371 |
| HADH_exon_7_2a | 494 | 1433 | 2372 |
| HADH_exon_8_1 | 495 | 1434 | 2373 |
| HADHA_exon_10-utr3_2a | 496 | 1435 | 2374 |
| HADHA_exon_11_1 | 497 | 1436 | 2375 |
| HADHA_exon_12_1 | 498 | 1437 | 2376 |
| HADHA_exon_13_1 | 499 | 1438 | 2377 |
| HADHA_exon_14_1 | 500 | 1439 | 2378 |
| HADHA_exon_15_1 | 501 | 1440 | 2379 |
| HADHA_exon_16_1 | 502 | 1441 | 2380 |
| HADHA_exon_17_1 | 503 | 1442 | 2381 |
| HADHA_exon_18_1 | 504 | 1443 | 2382 |
| HADHA_exon_19-utr3_3a | 505 | 1444 | 2383 |
| HADHA_exon_19-utr3_3b | 506 | 1445 | 2384 |
| HADHA_exon_1-utr5_1 | 507 | 1446 | 2385 |
| HADHA_exon_2-utr5_1 | 508 | 1447 | 2386 |

TABLE 2-continued

Target and Primer SEQ ID NOs

| Target Name | Target Sequence SEQ ID No | Forward Primer SEQ ID No | Reverse Primer SEQ ID No |
|---|---|---|---|
| HADHA_exon_4_1 | 509 | 1448 | 2387 |
| HADHA_exon_5_1 | 510 | 1449 | 2388 |
| HADHA_exon_6_1 | 511 | 1450 | 2389 |
| HADHA_exon_7_1 | 512 | 1451 | 2390 |
| HADHA_exon_8_1 | 513 | 1452 | 2391 |
| HADHA_exon_9_1 | 514 | 1453 | 2392 |
| HADHB_exon_10_1 | 515 | 1454 | 2393 |
| HADHB_exon_12_1 | 516 | 1455 | 2394 |
| HADHB_exon_13_1 | 517 | 1456 | 2395 |
| HADHB_exon_14_1 | 518 | 1457 | 2396 |
| HADHB_exon_15_1 | 519 | 1458 | 2397 |
| HADHB_exon_16-utr3_2a | 520 | 1459 | 2398 |
| HADHB_exon_1-utr5_1 | 521 | 1460 | 2399 |
| HADHB_exon_2-utr5_2a | 522 | 1461 | 2400 |
| HADHB_exon_3-utr5_3b | 523 | 1462 | 2401 |
| HADHB_exon_4_1 | 524 | 1463 | 2402 |
| HADHB_exon_5_1 | 525 | 1464 | 2403 |
| HADHB_exon_6_1 | 526 | 1465 | 2404 |
| HADHB_exon_7_1 | 527 | 1466 | 2405 |
| HADHB_exon_8_1 | 528 | 1467 | 2406 |
| HADHB_exon_9_1 | 529 | 1468 | 2407 |
| HLCS_exon_2_3a | 530 | 1469 | 2408 |
| HLCS_exon_2_3b | 531 | 1470 | 2409 |
| HLCS_exon_2_3c | 532 | 1471 | 2410 |
| HLCS_exon_3_1 | 533 | 1472 | 2411 |
| HLCS_exon_4_2a | 534 | 1473 | 2412 |
| HLCS_exon_5_1 | 535 | 1474 | 2413 |
| HLCS_exon_6_1 | 536 | 1475 | 2414 |
| HLCS_exon_7_1 | 537 | 1476 | 2415 |
| HLCS_exon_8_1 | 538 | 1477 | 2416 |
| HLCS_exon_9-utr3_9a | 539 | 1478 | 2417 |
| HMGCL_exon_1-utr5_1 | 540 | 1479 | 2418 |
| HMGCL_exon_2-utr3_1 | 541 | 1480 | 2419 |
| HMGCL_exon_3-utr3_1 | 542 | 1481 | 2420 |
| HMGCL_exon_4-utr3_2a | 543 | 1482 | 2421 |
| HMGCL_exon_5-utr3_2a | 544 | 1483 | 2422 |
| HMGCL_exon_6-utr3_4a | 545 | 1484 | 2423 |
| HMGCL_exon_7-utr3_1 | 546 | 1485 | 2424 |
| HMGCL_exon_9-utr3_2a | 547 | 1486 | 2425 |
| HPD_exon_10_1 | 548 | 1487 | 2426 |
| HPD_exon_11_1 | 549 | 1488 | 2427 |
| HPD_exon_12_1 | 550 | 1489 | 2428 |
| HPD_exon_13-utr3_1 | 551 | 1490 | 2429 |
| HPD_exon_2-utr5_1 | 552 | 1491 | 2430 |
| HPD_exon_3-utr5_2a | 553 | 1492 | 2431 |
| HPD_exon_3-utr5_2b | 554 | 1493 | 2432 |
| HPD_exon_4_1 | 555 | 1494 | 2433 |
| HPD_exon_5_1 | 556 | 1495 | 2434 |
| HPD_exon_6_1 | 557 | 1496 | 2435 |
| HPD_exon_7_1 | 558 | 1497 | 2436 |
| HPD_exon_8_1 | 559 | 1498 | 2437 |
| HPD_exon_9_1 | 560 | 1499 | 2438 |
| HPD_utr5_2_1 | 561 | 1500 | 2439 |
| HSD17B10_exon_1-utr5_1 | 562 | 1501 | 2440 |
| HSD17B10_exon_2_1 | 563 | 1502 | 2441 |
| HSD17B10_exon_3_1 | 564 | 1503 | 2442 |
| HSD17B10_exon_4_1 | 565 | 1504 | 2443 |
| HSD17B10_exon_5_1 | 566 | 1505 | 2444 |
| HSD17B10_exon_6-utr3_1 | 567 | 1506 | 2445 |
| IVD_exon_10-utr3_1 | 568 | 1507 | 2446 |
| IVD_exon_11-utr3_1 | 569 | 1508 | 2447 |
| IVD_exon_12-utr3_1 | 570 | 1509 | 2448 |
| IVD_exon_13-utr3_30aa | 571 | 1510 | 2449 |
| IVD_exon_13-utr3_9c | 572 | 1511 | 2450 |
| IVD_exon_14-utr3_1 | 573 | 1512 | 2451 |
| IVD_exon_15_1 | 574 | 1513 | 2452 |
| IVD_exon_16-utr3_2a | 575 | 1514 | 2453 |
| IVD_exon_1-utr5_2b | 576 | 1515 | 2454 |
| IVD_exon_2-utr5_1 | 577 | 1516 | 2455 |
| IVD_exon_3_1 | 578 | 1517 | 2456 |
| IVD_exon_4_1 | 579 | 1518 | 2457 |
| IVD_exon_5_1 | 580 | 1519 | 2458 |
| IVD_exon_6_1 | 581 | 1520 | 2459 |
| IVD_exon_7_1 | 582 | 1521 | 2460 |
| IVD_exon_8_1 | 583 | 1522 | 2461 |
| IVD_exon_9_2b | 584 | 1523 | 2462 |
| LMBRD1_exon_10_1 | 585 | 1524 | 2463 |
| LMBRD1_exon_11_1 | 586 | 1525 | 2464 |
| LMBRD1_exon_12_1 | 587 | 1526 | 2465 |
| LMBRD1_exon_13-utr3_1 | 588 | 1527 | 2466 |
| LMBRD1_exon_14-utr3_1 | 589 | 1528 | 2467 |
| LMBRD1_exon_15-utr3_1 | 590 | 1529 | 2468 |
| LMBRD1_exon_16-utr3_2a | 591 | 1530 | 2469 |
| LMBRD1_exon_1-utr5_1 | 592 | 1531 | 2470 |
| LMBRD1_exon_2-utr5_2a | 593 | 1532 | 2471 |
| LMBRD1_exon_2-utr5_2b | 594 | 1533 | 2472 |
| LMBRD1_exon_3_1 | 595 | 1534 | 2473 |
| LMBRD1_exon_4_1 | 596 | 1535 | 2474 |
| LMBRD1_exon_5_1 | 597 | 1536 | 2475 |
| LMBRD1_exon_6_1 | 598 | 1537 | 2476 |
| LMBRD1_exon_7_1 | 599 | 1538 | 2477 |
| LMBRD1_exon_8_1 | 600 | 1539 | 2478 |
| LMBRD1_exon_9_1 | 601 | 1540 | 2479 |
| MAT1A_exon_1-utr5_1 | 602 | 1541 | 2480 |
| MAT1A_exon_2_1 | 603 | 1542 | 2481 |
| MAT1A_exon_3_1 | 604 | 1543 | 2482 |
| MAT1A_exon_4_1 | 605 | 1544 | 2483 |
| MAT1A_exon_5_1 | 606 | 1545 | 2484 |
| MAT1A_exon_6_1 | 607 | 1546 | 2485 |
| MAT1A_exon_7_a | 608 | 1547 | 2486 |
| MAT1A_exon_7_b | 609 | 1548 | 2487 |
| MAT1A_exon_8_1 | 610 | 1549 | 2488 |
| MAT1A_exon_9-utr3_6a | 611 | 1550 | 2489 |
| MCCC1_exon_11-utr3_1 | 612 | 1551 | 2490 |
| MCCC1_exon_12-utr3_1 | 613 | 1552 | 2491 |
| MCCC1_exon_13-utr3_1 | 614 | 1553 | 2492 |
| MCCC1_exon_14-utr3_1 | 615 | 1554 | 2493 |
| MCCC1_exon_15-utr3_1 | 616 | 1555 | 2494 |
| MCCC1_exon_16-utr3_1 | 617 | 1556 | 2495 |
| MCCC1_exon_17-utr3_1 | 618 | 1557 | 2496 |
| MCCC1_exon_18-utr3_1 | 619 | 1558 | 2497 |
| MCCC1_exon_19-utr3_1 | 620 | 1559 | 2498 |
| MCCC1_exon_1-utr5_1 | 621 | 1560 | 2499 |
| MCCC1_exon_2-utr5_1 | 622 | 1561 | 2500 |
| MCCC1_exon_3_1 | 623 | 1562 | 2501 |
| MCCC1_exon_4-utr3_1 | 624 | 1563 | 2502 |
| MCCC1_exon_5-utr5_1 | 625 | 1564 | 2503 |
| MCCC1_exon_6-utr3_1 | 626 | 1565 | 2504 |
| MCCC1_exon_7-utr3_1 | 627 | 1566 | 2505 |
| MCCC1_exon_8-utr3_1 | 628 | 1567 | 2506 |
| MCCC1_exon_9-utr3_1 | 629 | 1568 | 2507 |
| MCCC2_exon_10_10a | 630 | 1569 | 2508 |
| MCCC2_exon_10_10f | 631 | 1570 | 2509 |
| MCCC2_exon_10_10h | 632 | 1571 | 2510 |
| MCCC2_exon_11-utr3_1 | 633 | 1572 | 2511 |
| MCCC2_exon_12-utr3_1 | 634 | 1573 | 2512 |
| MCCC2_exon_14-utr3_1 | 635 | 1574 | 2513 |
| MCCC2_exon_15-utr3_1 | 636 | 1575 | 2514 |
| MCCC2_exon_16-utr3_1 | 637 | 1576 | 2515 |
| MCCC2_exon_17-utr3_5a | 638 | 1577 | 2516 |
| MCCC2_exon_1-utr5_1 | 639 | 1578 | 2517 |
| MCCC2_exon_2_1 | 640 | 1579 | 2518 |
| MCCC2_exon_3_1 | 641 | 1580 | 2519 |
| MCCC2_exon_4_1 | 642 | 1581 | 2520 |
| MCCC2_exon_5_2a | 643 | 1582 | 2521 |
| MCCC2_exon_6_1 | 644 | 1583 | 2522 |
| MCCC2_exon_7_1 | 645 | 1584 | 2523 |
| MCCC2_exon_8_1 | 646 | 1585 | 2524 |
| MCCC2_exon_9_1 | 647 | 1586 | 2525 |
| MCEE_exon_1-utr5_2a | 648 | 1587 | 2526 |
| MCEE_exon_2-utr5_1 | 649 | 1588 | 2527 |
| MCEE_exon_3-utr3_2a | 650 | 1589 | 2528 |
| MCEE_exon_3-utr3_2b | 651 | 1590 | 2529 |
| MLYCD_exon_1-utr-5_2a | 652 | 1591 | 2530 |
| MLYCD_exon_1-utr5_2b | 653 | 1592 | 2531 |
| MLYCD_exon_2_1 | 654 | 1593 | 2532 |

TABLE 2-continued

Target and Primer SEQ ID NOs

| Target Name | Target Sequence SEQ ID No | Forward Primer SEQ ID No | Reverse Primer SEQ ID No |
|---|---|---|---|
| MLYCD_exon_3_1 | 655 | 1594 | 2533 |
| MLYCD_exon_4-utr3_12b | 656 | 1595 | 2534 |
| MLYCD_exon_4-utr3_12j | 657 | 1596 | 2535 |
| MLYCD_exon_4-utr3_12k | 658 | 1597 | 2536 |
| MMAA_exon_1-utr5_2a | 659 | 1598 | 2537 |
| MMAA_exon_1-utr5_2b | 660 | 1599 | 2538 |
| MMAA_exon_2-utr5_1 | 661 | 1600 | 2539 |
| MMAA_exon_3-utr5_2a | 662 | 1601 | 2540 |
| MMAA_exon_4_1 | 663 | 1602 | 2541 |
| MMAA_exon_5-utr5_1 | 664 | 1603 | 2542 |
| MMAA_exon_6-utr3_13a | 665 | 1604 | 2543 |
| MMAB_exon_1-utr5_2b | 666 | 1605 | 2544 |
| MMAB_exon_2-utr5_1 | 667 | 1606 | 2545 |
| MMAB_exon_3-utr5_1 | 668 | 1607 | 2546 |
| MMAB_exon_4-utr3_1 | 669 | 1608 | 2547 |
| MMAB_exon_5-utr3_1 | 670 | 1609 | 2548 |
| MMAB_exon_6-utr3_1 | 671 | 1610 | 2549 |
| MMAB_exon_7-utr3_1 | 672 | 1611 | 2550 |
| MMAB_exon_8-utr3_1 | 673 | 1612 | 2551 |
| MMAB_exon_9-utr3_9a | 674 | 1613 | 2552 |
| MMAB_utr3_2_1 | 675 | 1614 | 2553 |
| MMACHC_exon_1-utr5_1 | 676 | 1615 | 2554 |
| MMACHC_exon_2_1 | 677 | 1616 | 2555 |
| MMACHC_exon_3_1 | 678 | 1617 | 2556 |
| MMACHC_exon_4-utr3_21d | 679 | 1618 | 2557 |
| MMACHC_exon_4-utr3_6a | 680 | 1619 | 2558 |
| MMADHC_exon_1-utr5_2b | 681 | 1620 | 2559 |
| MMADHC_exon_2_1 | 682 | 1621 | 2560 |
| MMADHC_exon_3_1 | 683 | 1622 | 2561 |
| MMADHC_exon_4_1 | 684 | 1623 | 2562 |
| MMADHC_exon_5_1 | 685 | 1624 | 2563 |
| MMADHC_exon_6_1 | 686 | 1625 | 2564 |
| MMADHC_exon_7_1 | 687 | 1626 | 2565 |
| MMADHC_exon_8-utr3_2a | 688 | 1627 | 2566 |
| MMADHC_exon_8-utr3_2b | 689 | 1628 | 2567 |
| MTHFR_exon_10_1 | 690 | 1629 | 2568 |
| MTHFR_exon_11-utr3_14a | 691 | 1630 | 2569 |
| MTHFR_exon_1-utr5_5d | 692 | 1631 | 2570 |
| MTHFR_exon_1-utr5_5e | 693 | 1632 | 2571 |
| MTHFR_exon_2_1 | 694 | 1633 | 2572 |
| MTHFR_exon_3_1 | 695 | 1634 | 2573 |
| MTHFR_exon_4_1 | 696 | 1635 | 2574 |
| MTHFR_exon_5_1 | 697 | 1636 | 2575 |
| MTHFR_exon_6_1 | 698 | 1637 | 2576 |
| MTHFR_exon_7_1 | 699 | 1638 | 2577 |
| MTHFR_exon_8_1 | 700 | 1639 | 2578 |
| MTHFR_exon_9_1 | 701 | 1640 | 2579 |
| MTR_exon_10_1 | 702 | 1641 | 2580 |
| MTR_exon_11_1 | 703 | 1642 | 2581 |
| MTR_exon_12_1 | 704 | 1643 | 2582 |
| MTR_exon_13_1 | 705 | 1644 | 2583 |
| MTR_exon_14_1 | 706 | 1645 | 2584 |
| MTR_exon_15_1 | 707 | 1646 | 2585 |
| MTR_exon_16_1 | 708 | 1647 | 2586 |
| MTR_exon_17_1 | 709 | 1648 | 2587 |
| MTR_exon_18_1 | 710 | 1649 | 2588 |
| MTR_exon_19_1 | 711 | 1650 | 2589 |
| MTR_exon_1-utr5_2a | 712 | 1651 | 2590 |
| MTR_exon_1-utr5_2b | 713 | 1652 | 2591 |
| MTR_exon_2_1 | 714 | 1653 | 2592 |
| MTR_exon_20_1 | 715 | 1654 | 2593 |
| MTR_exon_21_1 | 716 | 1655 | 2594 |
| MTR_exon_22_1 | 717 | 1656 | 2595 |
| MTR_exon_23_1 | 718 | 1657 | 2596 |
| MTR_exon_24_1 | 719 | 1658 | 2597 |
| MTR_exon_25_1 | 720 | 1659 | 2598 |
| MTR_exon_26_1 | 721 | 1660 | 2599 |
| MTR_exon_27_1 | 722 | 1661 | 2600 |
| MTR_exon_28_1 | 723 | 1662 | 2601 |
| MTR_exon_29_1 | 724 | 1663 | 2602 |
| MTR_exon_3_1 | 725 | 1664 | 2603 |
| MTR_exon_30_1 | 726 | 1665 | 2604 |
| MTR_exon_31_3a | 727 | 1666 | 2605 |
| MTR_exon_31_3c | 728 | 1667 | 2606 |
| MTR_exon_32_1 | 729 | 1668 | 2607 |
| MTR_exon_33-utr3_18a | 730 | 1669 | 2608 |
| MTR_exon_4_1 | 731 | 1670 | 2609 |
| MTR_exon_5_1 | 732 | 1671 | 2610 |
| MTR_exon_6-utr3_1 | 733 | 1672 | 2611 |
| MTR_exon_7-utr3_1 | 734 | 1673 | 2612 |
| MTR_exon_8-utr3_1 | 735 | 1674 | 2613 |
| MTR_exon_9-utr3_1 | 736 | 1675 | 2614 |
| MTRR_exon_10_1 | 737 | 1676 | 2615 |
| MTRR_exon_11-utr3_2a | 738 | 1677 | 2616 |
| MTRR_exon_11-utr3_2b | 739 | 1678 | 2617 |
| MTRR_exon_12-utr3_1 | 740 | 1679 | 2618 |
| MTRR_exon_13_2b | 741 | 1680 | 2619 |
| MTRR_exon_14-utr3_1 | 742 | 1681 | 2620 |
| MTRR_exon_15-utr3_4a | 743 | 1682 | 2621 |
| MTRR_exon_1-utr5_1 | 744 | 1683 | 2622 |
| MTRR_exon_2-utr5_1 | 745 | 1684 | 2623 |
| MTRR_exon_3-utr3_1 | 746 | 1685 | 2624 |
| MTRR_exon_4-utr3_1 | 747 | 1686 | 2625 |
| MTRR_exon_5-utr3_1 | 748 | 1687 | 2626 |
| MTRR_exon_6-utr3_1 | 749 | 1688 | 2627 |
| MTRR_exon_7-utr3_1 | 750 | 1689 | 2628 |
| MTRR_exon_8-utr3_1 | 751 | 1690 | 2629 |
| MTRR_exon_9-utr3_1 | 752 | 1691 | 2630 |
| MTRR_utr5_1_2a | 753 | 1692 | 2631 |
| MUT_exon_10_1 | 754 | 1693 | 2632 |
| MUT_exon_11_1 | 755 | 1694 | 2633 |
| MUT_exon_12-utr3_5a | 756 | 1695 | 2634 |
| MUT_exon_1-utr5_2a | 757 | 1696 | 2635 |
| MUT_exon_1-utr5_2b | 758 | 1697 | 2636 |
| MUT_exon_2_1 | 759 | 1698 | 2637 |
| MUT_exon_3_1 | 760 | 1699 | 2638 |
| MUT_exon_4_1 | 761 | 1700 | 2639 |
| MUT_exon_5_1 | 762 | 1701 | 2640 |
| MUT_exon_6_1 | 763 | 1702 | 2641 |
| MUT_exon_7_1 | 764 | 1703 | 2642 |
| MUT_exon_8_1 | 765 | 1704 | 2643 |
| MUT_exon_9_1 | 766 | 1705 | 2644 |
| NAGS_exon_1-utr5_2a | 767 | 1706 | 2645 |
| NAGS_exon_1-utr5_2b | 768 | 1707 | 2646 |
| NAGS_exon_2_1 | 769 | 1708 | 2647 |
| NAGS_exon_3_1 | 770 | 1709 | 2648 |
| NAGS_exon_4_3a | 771 | 1710 | 2649 |
| NAGS_exon_4_3c | 772 | 1711 | 2650 |
| NAGS_exon_5_1 | 773 | 1712 | 2651 |
| NAGS_exon_6-utr3_2a | 774 | 1713 | 2652 |
| OPA3_exon_1-utr5_1 | 775 | 1714 | 2653 |
| OPA3_exon_2-utr3_20a | 776 | 1715 | 2654 |
| OPA3_exon_2-utr3_20b | 777 | 1716 | 2655 |
| OPA3_exon_3-utr3_6a | 778 | 1717 | 2656 |
| OPA3_exon_3-utr3_6b | 779 | 1718 | 2657 |
| OTC_exon_10-utr3_2a | 780 | 1719 | 2658 |
| OTC_exon_1-utr5_1 | 781 | 1720 | 2659 |
| OTC_exon_2_1 | 782 | 1721 | 2660 |
| OTC_exon_3_1 | 783 | 1722 | 2661 |
| OTC_exon_4_1 | 784 | 1723 | 2662 |
| OTC_exon_5_1 | 785 | 1724 | 2663 |
| OTC_exon_6_1 | 786 | 1725 | 2664 |
| OTC_exon_7_1 | 787 | 1726 | 2665 |
| OTC_exon_8_1 | 788 | 1727 | 2666 |
| OTC_exon_9_1 | 789 | 1728 | 2667 |
| PAH_exon_10_1 | 790 | 1729 | 2668 |
| PAH_exon_11_1 | 791 | 1730 | 2669 |
| PAH_exon_12_1 | 792 | 1731 | 2670 |
| PAH_exon_13_1 | 793 | 1732 | 2671 |
| PAH_exon_14-utr3_6a | 794 | 1733 | 2672 |
| PAH_exon_1-utr5_2b | 795 | 1734 | 2673 |
| PAH_exon_2-utr5_1 | 796 | 1735 | 2674 |
| PAH_exon_3_1 | 797 | 1736 | 2675 |
| PAH_exon_4_1 | 798 | 1737 | 2676 |
| PAH_exon_5_1 | 799 | 1738 | 2677 |
| PAH_exon_6_1 | 800 | 1739 | 2678 |

TABLE 2-continued

Target and Primer SEQ ID NOs

| Target Name | Target Sequence SEQ ID No | Forward Primer SEQ ID No | Reverse Primer SEQ ID No |
|---|---|---|---|
| PAH_exon_7_2a | 801 | 1740 | 2679 |
| PAH_exon_8_3c | 802 | 1741 | 2680 |
| PAH_exon_9_2b | 803 | 1742 | 2681 |
| PCBD1_exon_1-utr5_1 | 804 | 1743 | 2682 |
| PCBD1_exon_2_1 | 805 | 1744 | 2683 |
| PCBD1_exon_3_1 | 806 | 1745 | 2684 |
| PCBD1_exon_4-utr3_2a | 807 | 1746 | 2685 |
| PCCA_exon_10_1 | 808 | 1747 | 2686 |
| PCCA_exon_11_1 | 809 | 1748 | 2687 |
| PCCA_exon_12_1 | 810 | 1749 | 2688 |
| PCCA_exon_13_1 | 811 | 1750 | 2689 |
| PCCA_exon_14_1 | 812 | 1751 | 2690 |
| PCCA_exon_15_1 | 813 | 1752 | 2691 |
| PCCA_exon_16_1 | 814 | 1753 | 2692 |
| PCCA_exon_17_1 | 815 | 1754 | 2693 |
| PCCA_exon_18_1 | 816 | 1755 | 2694 |
| PCCA_exon_19_1 | 817 | 1756 | 2695 |
| PCCA_exon_1-utr5_1 | 818 | 1757 | 2696 |
| PCCA_exon_2_1 | 819 | 1758 | 2697 |
| PCCA_exon_20_1 | 820 | 1759 | 2698 |
| PCCA_exon_21_1 | 821 | 1760 | 2699 |
| PCCA_exon_22_1 | 822 | 1761 | 2700 |
| PCCA_exon_23_1 | 823 | 1762 | 2701 |
| PCCA_exon_24-utr3_1 | 824 | 1763 | 2702 |
| PCCA_exon_25_1 | 825 | 1764 | 2703 |
| PCCA_exon_26_1 | 826 | 1765 | 2704 |
| PCCA_exon_27_1 | 827 | 1766 | 2705 |
| PCCA_exon_28-utr3_1 | 828 | 1767 | 2706 |
| PCCA_exon_3_1 | 829 | 1768 | 2707 |
| PCCA_exon_4_1 | 830 | 1769 | 2708 |
| PCCA_exon_5_1 | 831 | 1770 | 2709 |
| PCCA_exon_6_1 | 832 | 1771 | 2710 |
| PCCA_exon_7_1 | 833 | 1772 | 2711 |
| PCCA_exon_8_1 | 834 | 1773 | 2712 |
| PCCA_exon_9_1 | 835 | 1774 | 2713 |
| PCCB_exon_10_1 | 836 | 1775 | 2714 |
| PCCB_exon_11_1 | 837 | 1776 | 2715 |
| PCCB_exon_12_1 | 838 | 1777 | 2716 |
| PCCB_exon_13_1 | 839 | 1778 | 2717 |
| PCCB_exon_14_1 | 840 | 1779 | 2718 |
| PCCB_exon_15_2a | 841 | 1780 | 2719 |
| PCCB_exon_15_2b | 842 | 1781 | 2720 |
| PCCB_exon_16-utr3_1 | 843 | 1782 | 2721 |
| PCCB_exon_17-utr3_1 | 844 | 1783 | 2722 |
| PCCB_exon_18-utr3_1 | 845 | 1784 | 2723 |
| PCCB_exon_19-utr3_12a | 846 | 1785 | 2724 |
| PCCB_exon_19-utr3_12c | 847 | 1786 | 2725 |
| PCCB_exon_1-utr5_1 | 848 | 1787 | 2726 |
| PCCB_exon_2_1 | 849 | 1788 | 2727 |
| PCCB_exon_4-utr5_1 | 850 | 1789 | 2728 |
| PCCB_exon_5_1 | 851 | 1790 | 2729 |
| PCCB_exon_6_1 | 852 | 1791 | 2730 |
| PCCB_exon_7_1 | 853 | 1792 | 2731 |
| PCCB_exon_8_1 | 854 | 1793 | 2732 |
| PCCB_exon_9_1 | 855 | 1794 | 2733 |
| PCCB_processed_transcript_1 | 856 | 1795 | 2734 |
| PPM1K_exon_1-utr5_13d | 857 | 1796 | 2735 |
| PPM1K_exon_1-utr5_13e | 858 | 1797 | 2736 |
| PPM1K_exon_1-utr5_13g | 859 | 1798 | 2737 |
| PPM1K_exon_1-utr5_13h | 860 | 1799 | 2738 |
| PPM1K_exon_2_1 | 861 | 1800 | 2739 |
| PPM1K_exon_3-utr5_1 | 862 | 1801 | 2740 |
| PPM1K_exon_4_1 | 863 | 1802 | 2741 |
| PPM1K_exon_5_1 | 864 | 1803 | 2742 |
| PPM1K_exon_6-utr3_47aa | 865 | 1804 | 2743 |
| PPM1K_exon_6-utr3_47ac | 866 | 1805 | 2744 |
| PTS_exon_1-utr5_1 | 867 | 1806 | 2745 |
| PTS_exon_2-utr5_3a | 868 | 1807 | 2746 |
| PTS_exon_3-utr5_1 | 869 | 1808 | 2747 |
| PTS_exon_4-utr5_2a | 870 | 1809 | 2748 |
| PTS_exon_4-utr5_2b | 871 | 1810 | 2749 |
| PTS_exon_5-utr3_1 | 872 | 1811 | 2750 |
| PTS_exon_6-utr3_2a | 873 | 1812 | 2751 |
| PTS_utr5_1 | 874 | 1813 | 2752 |
| QDPR_exon_1-utr5_1 | 875 | 1814 | 2753 |
| QDPR_exon_3-utr3_1 | 876 | 1815 | 2754 |
| QDPR_exon_4-utr3_1 | 877 | 1816 | 2755 |
| QDPR_exon_5_1 | 878 | 1817 | 2756 |
| QDPR_exon_6-utr3_2a | 879 | 1818 | 2757 |
| QDPR_exon_7-utr3_3a | 880 | 1819 | 2758 |
| SLC22A5_exon_1-utr5_2a | 881 | 1820 | 2759 |
| SLC22A5_exon_1-utr5_2b | 882 | 1821 | 2760 |
| SLC22A5_exon_2_6f | 883 | 1822 | 2761 |
| SLC22A5_exon_3_15a | 884 | 1823 | 2762 |
| SLC22A5_exon_3_15o | 885 | 1824 | 2763 |
| SLC22A5_exon_4-utr3_1 | 886 | 1825 | 2764 |
| SLC22A5_exon_5-utr3_1 | 887 | 1826 | 2765 |
| SLC22A5_exon_6-utr3_6a | 888 | 1827 | 2766 |
| SLC22A5_exon_6-utr3_6f | 889 | 1828 | 2767 |
| SLC22A5_exon_7-utr3_1 | 890 | 1829 | 2768 |
| SLC22A5_exon_8-utr3_1 | 891 | 1830 | 2769 |
| SLC22A5_exon_9-utr3_4a | 892 | 1831 | 2770 |
| SLC25A13_exon_10_1 | 893 | 1832 | 2771 |
| SLC25A13_exon_11_1 | 894 | 1833 | 2772 |
| SLC25A13_exon_12_1 | 895 | 1834 | 2773 |
| SLC25A13_exon_13_1 | 896 | 1835 | 2774 |
| SLC25A13_exon_14_1 | 897 | 1836 | 2775 |
| SLC25A13_exon_15_1 | 898 | 1837 | 2776 |
| SLC25A13_exon_16_1 | 899 | 1838 | 2777 |
| SLC25A13_exon_17-utr3_3a | 900 | 1839 | 2778 |
| SLC25A13_exon_1-utr5_1 | 901 | 1840 | 2779 |
| SLC25A13_exon_2-utr5_1 | 902 | 1841 | 2780 |
| SLC25A13_exon_3-utr5_1 | 903 | 1842 | 2781 |
| SLC25A13_exon_4_1 | 904 | 1843 | 2782 |
| SLC25A13_exon_5-utr3_1 | 905 | 1844 | 2783 |
| SLC25A13_exon_6_1 | 906 | 1845 | 2784 |
| SLC25A13_exon_7_1 | 907 | 1846 | 2785 |
| SLC25A13_exon_8_1 | 908 | 1847 | 2786 |
| SLC25A13_exon_9_1 | 909 | 1848 | 2787 |
| SLC25A13_processed_transcript_2_1 | 910 | 1849 | 2788 |
| SLC25A20_exon_1-utr5_1 | 911 | 1850 | 2789 |
| SLC25A20_exon_2-utr5_1 | 912 | 1851 | 2790 |
| SLC25A20_exon_3-utr3_1 | 913 | 1852 | 2791 |
| SLC25A20_exon_4-utr3_1 | 914 | 1853 | 2792 |
| SLC25A20_exon_5-utr3_1 | 915 | 1854 | 2793 |
| SLC25A20_exon_6-utr3_1 | 916 | 1855 | 2794 |
| SLC25A20_exon_7-utr3_1 | 917 | 1856 | 2795 |
| SLC25A20_exon_8-utr3_1 | 918 | 1857 | 2796 |
| SLC25A20_exon_9-utr3_3a | 919 | 1858 | 2797 |
| TAT_exon_1_4a | 920 | 1859 | 2798 |
| TAT_exon_1_4b | 921 | 1860 | 2799 |
| TAT_exon_2_1 | 922 | 1861 | 2800 |
| TAT_exon_3_1 | 923 | 1862 | 2801 |
| TAT_exon_4_1 | 924 | 1863 | 2802 |
| TAT_exon_5_1 | 925 | 1864 | 2803 |
| TAT_exon_6_1 | 926 | 1865 | 2804 |
| TAT_exon_7_1 | 927 | 1866 | 2805 |
| TAT_exon_8_1 | 928 | 1867 | 2806 |
| TAT_exon_9-utr3_9a | 929 | 1868 | 2807 |
| TAT_exon_9-utr3_9b | 930 | 1869 | 2808 |
| TAZ_exon_1-utr5_2b | 931 | 1870 | 2809 |
| TAZ_exon_2_2a | 932 | 1871 | 2810 |
| TAZ_exon_3-utr3_3b | 933 | 1872 | 2811 |
| TAZ_exon_3-utr3_3c | 934 | 1873 | 2812 |
| TAZ_exon_5-utr3_5c | 935 | 1874 | 2813 |
| TAZ_exon_5-utr3_5d | 936 | 1875 | 2814 |
| TAZ_exon_5-utr3_5e | 937 | 1876 | 2815 |
| TAZ_exon_6-utr3_1 | 938 | 1877 | 2816 |
| TAZ_exon_7-utr3_3a | 939 | 1878 | 2817 |

TABLE 4

DNA Sequencing and Metabolic Data Analysis in 80 Newborns

| DBS ID | Condition | RUSPseq | P/LP in 8 MMA genes | VUS in 8 MMA genes | PMID for 8 MMA | P/LP in 64 RUSPseq | PMID for 64 genes |
|---|---|---|---|---|---|---|---|
| A1 | mut⁰ | MUT: P/LP | MUT (c.C682T:p.R228X)#  (c.C581T:p.P194L); LMBRD1 (c.G1464A:p.W488X); MMACHC (c.A452G:p.H151R)# | — | 15643616, 20631720, 27060300, 27233228 | | |
| B1 | mut⁰ | MUT: P/LP, MMAA: P/P | MUT (c.T1620A:p.C540X)#, (c.C322T:p.R108C)#; MMAA (c.G3A:p.M1I), (c.931delA:p.K311fs) | — | 19862841, 16281286, 20301409 | — | |
| C1 | mut⁰ | MUT: P/P | MUT (c.C982T:p.L328F*Hom)# | — | 15643616, 25125334 | | |
| D1 | mut⁰ | MUT: P/LP | MUT (c.678_679insAATTTATG: p.V227fs)#, (c.G607A:p.G203R)#; LMBRD1 (c.G879A:p.W293X); MMAB (c.137delC:p.P46fs) | — | 15781192, 23045948, 10923046, 19375370, 17432548 | | |
| E1 | mut⁰ | MUT: LP/LP | MUT (c.C1843A:p.P615T), (c.C422T: p.A141V); MCEE (c. −245 − 1G > A) | — | 28973083 | | |
| F1 | mut⁰ | MUT:P/VUS | MUT (c.C682T:p.R228X)# | MUT (c.1846C > T:p.R616C) | 15643616 | | |
| G1 | mut⁰ | QC: low read depth | — | — | — | | |
| H1 | mut⁰ | MUT: P/P | MUT (c.C693G:p.Y231X)#, c.1399C > T (p.R467X)# | — | 27167370, 25736335, 23430940, 15643616, 12402345, 22727635 | | |
| A2 | mut⁰ | MUT: P/P | MUT (c.G607A:p.G203R*Hom)#; MMAB (c.T2A:p.M1K); MMADHC (c.509delA:p.N170fs) | — | 10923046, 19375370, 17432548 | | |
| B2 | mut⁰ | False negative (MUT: P/−) | MUT (c.C454T:p.R152X)# | — | ClinVar | | |
| C2 | mut⁰ | MUT: P/P | MUT (c.1891delG:p.A631fs)#, (c.678_679insAATTTATG: p.V227fs)#; MMAB (c.135 − 2A > G) | — | 16281286, 15781192, 23045948 | PAH (c.G1243A: p.D415N)#, (c.C498A: p.Y166X) | 9781015, 7556322 |
| D2 | mut⁰ | MUT: P/P | MUT (c.2194_2197delGCCG/insAAGGT)#, (c.C682T:p.R228X)#; MMAA (c.A829G:p.R277G) | — | 15643616, 10923046 | | |
| E2 | mut⁰ | MUT: LP/P | MUT (c.C322T:p.R108C)#, (c.C682T:p.R228X)# | — | 20301409, 16281286, 15643616 | | |
| F2 | mut⁰ | MUT: LP/LP | MUT (c.G607A:p.G203R*Hom)#; MMACHC (c.401_402del:p.D134fs) | — | 10923046, 19375370, 17432548 | | |
| G2 | mut⁰ | MUT: P/P | MUT (c.G1560C:p.K520N*Hom)#; MMAB (c.T426A:p.Y142X) | — | 17075691 | | |
| H2 | Cbl C, D, F | MMACHC: P/LP | MMACHC (c.326_329del:p.P109fs)#, (c.G482A:p.R161Q)# | — | ClinVar | | |
| A3 | Cbl C, D, F | MMACHC: P/P | MMACHC (c.271dupA:p.V90fs)#, (c.C615G:p.Y205X)# | — | 19370762, 20631720, 25687216, 20631720 | | |
| B3 | Cbl C, D, F | MMACHC: P/P | MMACHC (c.82 − 2A > G), (c.G609A:p.W203X)# | — | 19370762, 16311595 | | |
| C3 | Cbl C, D, F | MMACHC: P/LP/P | MMACHC (c.C28T:p.Q10X), (c.T578C:p.L193P)#, (c.G608A:p.W203X)#; MCEE (c.G428A:p.R143H); MUT (c.G1897A:p.V633I) | — | 19370762, 16311595 | | |
| D3 | Cbl C, D, F | QC: failed DNA extraction | — | — | — | | |
| E3 | Cbl C, D, F | MMACHC: P/LP | MMACHC (c.271dupA:p.V90fs)#, (c.T578C:p.L193P)# | — | 19370762, 20631720, 16311595 | | |
| F3 | Cbl C, D, F | False negative (−/−) | — | MMACHC (c.T176C:p.F59S) | — | | |
| G3 | Cbl C, D, F | MMACHC: P/P | MMACHC (c.271dupA:p.V90fs*Hom)#; MUT (c.T2099C:p.M700T) | — | 19370762, 20631720 | | |

TABLE 4-continued

DNA Sequencing and Metabolic Data Analysis in 80 Newborns

| DBS ID | Condition | RUSPseq | P/LP in 8 MMA genes | VUS in 8 MMA genes | PMID for 8 MMA | P/LP in 64 RUSPseq | PMID for 64 genes |
|---|---|---|---|---|---|---|---|
| H3 | Cbl C, D, F | MMACHC: P/LP | MMACHC (c.326_329del:p.P109fs)#, (c.G482A:p.R161Q)#; MMAA (c.672delA:p.T224fs); MMADHC (c.G170A:p.W57X) | — | 19370762 | | |
| A4 | Cbl C, D, F | MMACHC: P/LP | MMACHC (c.567dupT:p.R189fs)#, (c.G482A:p.R161Q)# | — | 19370762, 21835369 | | |
| B4 | Cbl C, D, F | MMACHC: P/P | MMACHC (c.326_329del:p.P109fs*Hom)#; MCEE (c.T305A:p.L102X); MMAB (c.A653T:p.D218V); MUT (c.C1849T:p.L617F) | — | ClinVar | PCCA (c.1070delG: p.R357fs), (c.1963-2A>G) | |
| C4 | Cbl C, D, F | MMACHC: P/P | MMACHC (c.G608A:p.W203X*Hom)# | — | 27167370, 19370762, 16311595 | MTHFR (c.C778T:p.Q260X), (c.G160T:p.E54X) | |
| D4 | Cbl C, D, F | MMACHC: P/P | MMACHC (c.434dupT:p.I145fs), (c.271dupA:p.V90fs)# | — | 19370762, 20631720 | | |
| E4 | Cbl C, D, F | MMACHC: P/P | MMACHC (c.271dupA:p.V90fs*Hom)# | — | 19370762, 20631720 | | |
| F4 | Cbl C, D, F | False negative (MMADHC: P/-) | MMADHC (c.680delC:p.P227fs) | — | — | | |
| G4 | Control | — | — | — | — | | |
| H4 | Control | — | — | — | — | | |
| A5 | Control | — | — | — | — | | |
| B5 | Control | — | MMADHC (c.T610C:p.F204L) | — | — | | |
| C5 | Control | — | — | — | — | | |
| D5 | Control | — | — | — | — | | |
| E5 | Control | — | — | — | — | | |
| F5 | Control | — | — | — | — | | |
| G5 | Control | — | MMAA (c.562 + 2T > C) | — | — | | |
| H5 | Control | — | MUT (c.C890T:p.T297I) | — | — | | |
| A6 | Control | — | MMAB (c.305delT:p.L102X) | — | — | | |
| B6 | Control | — | — | — | — | | |
| C6 | Control | — | — | — | — | | |
| D6 | Control | — | — | — | — | | |
| E6 | Control | — | MMACHC (c.259 – 2A > T) | — | — | | |
| F6 | Control | — | — | — | — | | |
| G6 | Control | — | — | — | — | | |
| H6 | Control | — | — | — | — | PAH (c.A204T: p.R68S)#, (c.A286T: p.K96X) (variants in cis) | 26666653, 23764561, 23500595 |
| A7 | Control | — | MMAA (c.C1114T:p.Q372X) | — | — | | |
| B7 | Control | — | — | — | — | | |
| A8 | MMA.FP | — | MMAA (c.G1079C:p.R360P) | — | — | | |
| B8 | MMA.FP | — | MMAB (c.644 + 1G > C) | — | — | MLYCD (c.C886T: p.Q296X), (c.799 – 2A > T) (variants in cis) | — |
| C8 | MMA.FP | — | — | — | — | | |
| D8 | MMA.FP | — | — | — | — | | |
| E8 | MMA.FP | — | MUT (c.C1741T:p.R581X)# | — | 27233228 | | |
| F8 | MMA.FP | — | — | — | — | | |
| G8 | MMA.FP | — | — | — | — | | |
| H8 | MMA.FP | — | — | — | — | | |
| A9 | MMA.FP | — | MMAA (c.A1072T:p.K358X) | — | — | | |
| B9 | MMA.FP | — | — | — | — | | |
| C9 | MMA.FP | — | — | — | — | | |
| D9 | MMA.FP | — | — | — | — | | |
| E9 | MMA.FP | — | LMBRD1 (c.C811T:p.Q271X) | — | — | | |
| F9 | MMA.FP | — | MUT (c.G278A:p.R93H)# | — | 1670635 | | |
| G9 | MMA.FP | — | MMAB(c.585 – 1G > A)# | — | 22695176 | | |
| H9 | MMA.FP | — | MUT (c.C1237T:p.Q413X) | — | — | HPD (c.832 – 2A > T), (c.241 + 2T > C) | |
| A10 | MMA.FP | — | MMAB (c.349 – 2A > T) | — | — | | |
| B10 | MMA.FP | — | MMACHC (c.463delG:p.G155fs) | — | — | | |
| C10 | MMA.FP | — | MCEE (c.85 – 2A > G) | — | — | ACADVL (c.174delC: | |

TABLE 4-continued

DNA Sequencing and Metabolic Data Analysis in 80 Newborns

| DBS ID | Condition | RUSPseq | P/LP in 8 MMA genes | VUS in 8 MMA genes | PMID for 8 MMA | P/LP in 64 RUSPseq | PMID for 64 genes |
|---|---|---|---|---|---|---|---|
| D10 | MMA.FP | — | — | — | — | p.G58fs), (c.62 + 2T > C) | |
| E10 | MMA.FP | LMBRD1: P/VUS (variants in cis) | LMBRD1 (c.C1321T:p.Q441X); MMAB (c.621delG:p.A207fs); | LMBRD1 (c.C1242T: p.C414C) | — | FAH (c.788delT: p.V263fs), (c.930delG: p.Q310fs) | |
| F10 | MMA.FP | — | LMBRD1 (c.T2C:p.M1T); MMACHC (c.362delC:p.A121fs) | — | — | | |
| G10 | MMA.FP | — | LMBRD1 (c.G1464A:p.W488X) | — | — | CPS1 (c.G741A: p.W247X), (c.C1891T: p.Q631X) | |
| H10 | MMA.FP | MUT: P/LP (variants in cis) | MUT (c.1818delA:p.K606fs), (c.G1810A:p.V604I) | — | — | | |
| A11 | MMA.FP | — | — | — | — | DBT (c.A31G: p.S11G), (c.889delA: p.I297fs) | |
| B11 | MMA.FP | — | — | — | — | | |
| C11 | MMA.FP | QC: failed DNA extraction | — | — | — | | |
| D11 | MMA.FP | — | MMAA (c.534_535del:p.A178fs) | — | — | GALT (c.569delG: p.W190fs) | |
| E11 | MMA.FP | — | — | — | — | NAGS(c.732delC: p.D244fs), (c.1399_1400i nsC:p.D467fs), (c.A1605G: p.X535W) | |
| F11 | MMA.FP | — | — | — | — | | |

Condition: mut$^0$ = methylmalonyl-CoA mutase mut 0 enzymatic subtype; Cbl C, D, F = cobalamin deficieny type C, D and F. Control = healthy controls sample. FP = false positive case
RUSPseq: Reportable finding with gene name and identified variants. P = pathogenic; LP = Likely pathogenic; VUS = variant of unknown significance; QC = quality control.
P/LP in 8 MMA genes: Gene names in bold indicate genes identified with two P/LP in 1 gene. ($^#$) = known pathogenic variant in ClinVar or PubMed.
VUS in 8 MMA genes: VUS are reported for TP and FP samples with only 1 P/LP in a MMA gene.
P/LP in 64 RUSPseq genes: Variants identified in 64 genes other than the 8 MMA genes. ($^#$) = known pathogenic variant in ClinVar or PubMed.

SEQUENCE LISTING

The patent contains a lengthy sequence listing. A copy of the sequence listing is available in electronic form from the USPTO web site (https://seqdata.uspto.gov/docdetail?docId=US12522856B2). An electronic copy of the sequence listing will also be available from the USPTO upon request and payment of the fee set forth in 37 CFR 1.19(b)(3).

What is claimed is:

1. A composition for performing PCR comprising:
a universal primer having a sequence; and
a plurality of primer pairs, wherein each primer pair comprises a forward primer and a reverse primer, wherein the forward and the reverse primer comprises a general 5'-A-B-3' structure, where A is a sequence that is the same as the universal primer sequence and B represents a target specific sequence;
wherein the forward primers and reverse primers further comprise a spacer sequence, C, wherein the forward and reverse primers comprise a general 5'-A-C-B-3' structure, wherein the spacer sequence C of all forward primers is the same and the spacer sequence C of all reverse primers is the same, wherein each spacer sequence C is configured to provide directionality for generating a sequence library, wherein the spacer in each forward primer consists of the sequence TCTG and the spacer in each reverse primer consists of the sequence AGAC.

2. The composition of claim 1, wherein the sequence A possesses a melting temperature that is greater than the melting temperature of each target specific sequence B.

3. The composition of claim 1, wherein the plurality of primer pairs is at least 50 primer pairs.

4. The composition of claim 1, wherein the plurality of primer pairs is at least 500 primer pairs.

5. The composition of claim 1, wherein the universal primer and the plurality of primer pairs are at a ratio of between 2:1 and 10:1.

6. The composition of claim 1, wherein the universal primer sequence is SEQ ID: 2818.

7. The composition of claim 1, wherein the target specific sequence for each forward primer in the plurality of primer pairs is selected from the group consisting of SEQ ID NOs: 940-1878, and the target specific sequence for each reverse primer in the plurality of primer pairs is selected from the group consisting of SEQ ID NOs: 1879-2817.

* * * * *